US012579738B2

(12) United States Patent
Li

(10) Patent No.: US 12,579,738 B2
(45) Date of Patent: Mar. 17, 2026

(54) INFORMATION PRESENTING METHOD, SYSTEM THEREOF, ELECTRONIC DEVICE, AND COMPUTER-READABLE STORAGE MEDIUM

(71) Applicant: BOE TECHNOLOGY GROUP CO., LTD., Beijing (CN)

(72) Inventor: Cunqing Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 293 days.

(21) Appl. No.: 18/006,008

(22) PCT Filed: Oct. 29, 2021

(86) PCT No.: PCT/CN2021/127492
§ 371 (c)(1),
(2) Date: Jan. 19, 2023

(87) PCT Pub. No.: WO2023/070538
PCT Pub. Date: May 4, 2023

(65) Prior Publication Data
US 2024/0249468 A1 Jul. 25, 2024

(51) Int. Cl.
*G06T 17/00* (2006.01)

(52) U.S. Cl.
CPC .................................... *G06T 17/00* (2013.01)

(58) Field of Classification Search
CPC ..... G06T 17/00; G06T 15/10; G06T 2200/24; G06T 2210/62; G06T 2219/004; G06T 19/00
See application file for complete search history.

(56) References Cited

U.S. PATENT DOCUMENTS

| | | | |
|---|---|---|---|
| 9,412,121 B2* | 8/2016 | Tatzel | G06Q 30/0276 |
| 11,087,543 B1* | 8/2021 | Cowburn | G06F 16/54 |

(Continued)

FOREIGN PATENT DOCUMENTS

| | | |
|---|---|---|
| CN | 104133647 A | 11/2014 |
| CN | 108197325 A | 6/2018 |

(Continued)

OTHER PUBLICATIONS

CN-111414225-A (Machine Translation on Jan. 1, 2025) (Year: 2020).*

(Continued)

*Primary Examiner* — Michael Le
(74) *Attorney, Agent, or Firm* — LEASON ELLIS LLP

(57) ABSTRACT

An information presenting method, a presenting system, an electronic device, and a computer-readable storage medium are disclosed. The information presenting method includes: presenting data information in a data presenting panel layer; and presenting three-dimensional model information in a three-dimensional model presenting layer, the three-dimensional model presenting layer is different from the data presenting panel layer; the data presenting panel layer and the three-dimensional model presenting layer communicate with each other through a support layer, and the data information is associated with the three-dimensional model information. The information presenting method can allow a user to conveniently view a scene presented by the three-dimensional model and the data information corresponding (Continued)

to the scene, which reduces operational complexity for the user to view the scene and the data corresponding to the scene.

16 Claims, 11 Drawing Sheets

(56) References Cited

U.S. PATENT DOCUMENTS

| | | | | |
|---|---|---|---|---|
| 11,532,141 | B1 * | 12/2022 | Vierra | G06Q 10/0631 |
| 2009/0187385 | A1 * | 7/2009 | Zegdoun | G06T 15/40 |
| | | | | 703/1 |
| 2012/0229449 | A1 * | 9/2012 | Psistakis | G06T 19/00 |
| | | | | 345/419 |
| 2013/0300740 | A1 * | 11/2013 | Snyder | G06T 17/00 |
| | | | | 345/419 |
| 2014/0100994 | A1 | 4/2014 | Tatzel | |
| 2015/0248503 | A1 * | 9/2015 | Glunz | G06T 17/00 |
| | | | | 703/1 |
| 2015/0262423 | A1 * | 9/2015 | Heinz, II | H04N 21/23412 |
| | | | | 386/241 |
| 2016/0147913 | A1 * | 5/2016 | Bergin | G06F 30/20 |
| | | | | 703/1 |
| 2017/0132567 | A1 * | 5/2017 | Glunz | G06T 17/05 |
| 2017/0221237 | A1 * | 8/2017 | Pate | G06T 11/206 |
| 2018/0329609 | A1 * | 11/2018 | De Swarte | G06T 17/10 |
| 2021/0279957 | A1 * | 9/2021 | Eder | H04N 23/90 |
| 2022/0237254 | A1 | 7/2022 | Li | |
| 2022/0415063 | A1 * | 12/2022 | Bai | G06V 20/20 |

FOREIGN PATENT DOCUMENTS

| | | | | |
|---|---|---|---|---|
| CN | 109903380 A | 6/2019 | | |
| CN | 110516368 A | 11/2019 | | |
| CN | 111178191 A | 5/2020 | | |
| CN | 111414225 A | * 7/2020 | | G06F 3/1454 |
| CN | 112799663 A | 5/2021 | | |
| CN | 113094138 A | 7/2021 | | |
| WO | 2021204296 A1 | 10/2021 | | |

OTHER PUBLICATIONS

Yan Haitao et al. Design and Implementation of 3D Visualization System for Power Industry Based on ArcEngine, Geomatics Spatial Information Technology Apr. 30, 2015 vol. 38 No. 4 pp. 84-91.

Mumumusuc, Using 3D in Flutter, https://www.bilibili.com/read/cv5353785, pp. 1-7, Mar. 30, 2020.

Osc_u611mlkv Exploration of Flutter 3D Drawing, https://my.oschina.net/u/4363726/blog/4260933 pp. 1-3, May 1, 2020.

Cheng Ziqing, Flutter's specific practice in developing smart city related apps, Software Development, Copyright 1994-2021, China Academic Journal Electronic Publishing.

Lao Meng Flutter, Rendering 3D models in Flutter, Using 3D in Flutter, https://cloud.tencent.com/developer/article/1816577, pp. 1-8, Apr. 22, 2021.

* cited by examiner

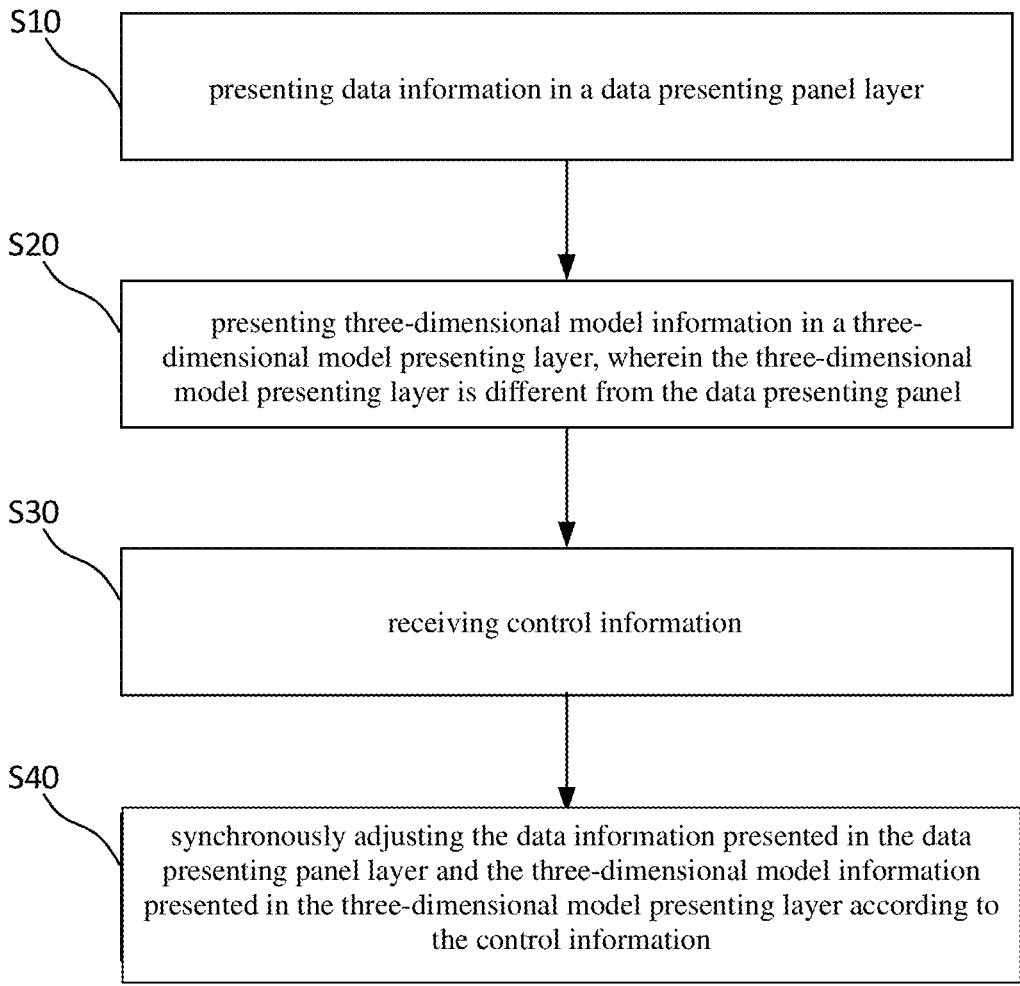

S10 presenting data information in a data presenting panel layer

S20 presenting three-dimensional model information in a three-dimensional model presenting layer, wherein the three-dimensional model presenting layer is different from the data presenting panel

S30 receiving control information

S40 synchronously adjusting the data information presented in the data presenting panel layer and the three-dimensional model information presented in the three-dimensional model presenting layer according to the control information

Providing a data presenting panel layer in a first terminal

S60

Providing a three-dimensional model presenting layer in a second terminal

S10

Presenting data information in a data presenting panel layer

S20

Presenting three-dimensional model information in a three-dimensional model presenting layer, the three-dimensional model presenting layer is different from the data presenting panel layer

FIG. 3

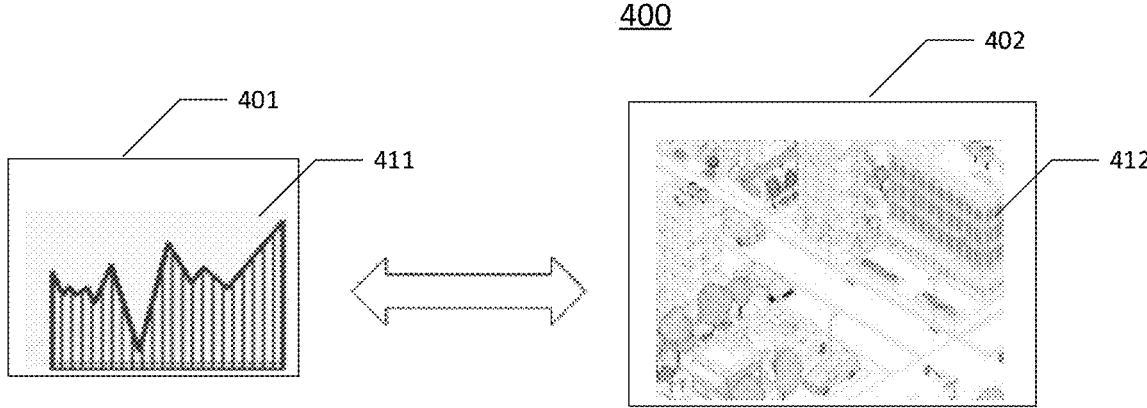

Terminal 501

Control information     Control information

WebSocket

Terminal 502

500

INFORMATION PRESENTING METHOD, SYSTEM THEREOF, ELECTRONIC DEVICE, AND COMPUTER-READABLE STORAGE MEDIUM

This application is a U.S. National Phase Entry of International Application No. PCT/CN2021/127492 filed on Oct. 29, 2021. The present application claims priority to and the benefit of the above-identified application and the above-identified application is incorporated by reference herein in its entirety.

TECHNICAL FIELD

Embodiments of the present disclosure relate to an information presenting method, an information presenting system, an electronic device, and a computer-readable storage medium.

BACKGROUND

With the development of science and technology as well as the Internet of Things, people's lives are becoming more and more intelligent, and technologies such as smart cities, smart parks, and smart enterprises have also emerged. The technologies such as smart cities, smart parks, and smart enterprises are models that use new-generation information technologies such as the Internet of Things, cloud computing, big data, and spatial information integration to promote cities, parks, or enterprises to enter into smart service, management, and construction.

For example, a smart city covers a lot of data; and core data, for example, includes: population data, building data, vehicle data, pollutant data, ecological data, etc. Combining these data with a city model, and then presenting the same to a user through visual means, can facilitate the user understanding basic information of the city more intuitively, and improve efficiency of city management and city construction.

SUMMARY

At least one embodiment of the present disclosure provides an information presenting method, comprising: presenting data information in a data presenting panel layer; and presenting three-dimensional model information in a three-dimensional model presenting layer, wherein the three-dimensional model presenting layer is different from the data presenting panel layer; and wherein the data presenting panel layer and the three-dimensional model presenting layer communicate with each other through a support layer, and the data information is associated with the three-dimensional model information.

For example, in the information presenting method provided by at least one embodiment of the present disclosure, the data presenting panel layer and the three-dimensional model presenting layer are provided on a same page to present the data information and the three-dimensional model information.

For example, in the information presenting method provided by at least one embodiment of the present disclosure, the data presenting panel layer and the three-dimensional model presenting layer are stacked on the page to present the data information and the three-dimensional model information.

For example, in the information presenting method provided by at least one embodiment of the present disclosure, the data presenting panel layer is closer to a viewer than the three-dimensional model presenting layer, and the data presenting panel layer is at least partially configured to be transparent or translucent to reveal at least a portion of the three-dimensional model presenting layer.

For example, in the information presenting method provided by at least one embodiment of the present disclosure, the support layer is presented in the page in a form of a base layer, and the data presenting panel layer and the three-dimensional model presenting layer are stacked on the base layer.

For example, in the information presenting method provided by at least one embodiment of the present disclosure, the page is displayed as a window form.

For example, in the information presenting method provided by at least one embodiment of the present disclosure, the data presenting panel layer is deployed in a first container of the support layer, and the three-dimensional model presenting layer is deployed in a second container of the support layer.

For example, in the information presenting method provided by at least one embodiment of the present disclosure, the data presenting panel layer is obtained based on a cross-platform interface development framework.

For example, in the information presenting method provided by at least one embodiment of the present disclosure, the data presenting panel layer is a panel layer supported by a browser or a panel layer supported by an operating system.

For example, the information presenting method provided by at least one embodiment of the present disclosure further comprises: receiving control information; and synchronously adjusting the data information presented in the data presenting panel layer and the three-dimensional model information presented in the three-dimensional model presenting layer according to the control information.

For example, in the information presenting method provided by at least one embodiment of the present disclosure, the data presenting panel layer and/or the three-dimensional model presenting layer directly receives the control information; or the data presenting panel layer and the three-dimensional model presenting layer receive the control information through the support layer.

For example, in the information presenting method provided by at least one embodiment of the present disclosure, the control information is provided by an operation terminal; or the data presenting panel layer is further provided with an operation control to allow a user to input the control information.

For example, in the information presenting method provided by at least one embodiment of the present disclosure, the control information is acquired by another data panel layer provided on the operation terminal.

For example, in the information presenting method provided by at least one embodiment of the present disclosure, the data presenting panel layer and the three-dimensional model presenting layer communicate with each other through one of following means of the support layer: Windows form message, function call, JavaScript call, WebSocket protocol, Http protocol, TCP protocol, UDP protocol.

For example, in the information presenting method provided by at least one embodiment of the present disclosure, the data information is associated with the three-dimensional model information, comprises: in response to a change in the three-dimensional model information presented by the three-dimensional model presenting layer, the data information presented by the data presenting panel layer being updated; and/or in response to a change in the data information presented by the data presenting panel layer, the three-dimensional model information presented by the three-dimensional model presenting layer being updated.

For example, the information presenting method provided by at least one embodiment of the present disclosure further comprises: providing the data presenting panel layer in a first terminal; and providing the three-dimensional model presenting layer in a second terminal; wherein the support layer is deployed in the first terminal and/or the second terminal and the data information and the three-dimensional model information are simultaneously presented in the first terminal and the second terminal.

At least one embodiment of the present disclosure provides a presenting system, comprising a first terminal, wherein the first terminal is configured to provide a first data presenting panel layer to present data information, and is configured to provide a three-dimensional model presenting layer to present three-dimensional model information, the three-dimensional model presenting layer is different from the data presenting panel layer; the first data presenting panel layer and the three-dimensional model presenting layer communicate with each other through the support layer, and the data information is associated with the three-dimensional model information.

For example, the presenting system provided by at least one embodiment of the present disclosure further comprises a second terminal, wherein the second terminal is configured to provide a second data presenting panel layer, and the second data presenting panel layer and the first data presenting panel layer communicate with each other; or the second terminal is configured to provide a three-dimensional model presenting layer to present the three-dimensional model information, and the three-dimensional model presenting layer communicates with the first data presenting panel layer.

At least one embodiment of the present disclosure provides a presenting system, comprising a first terminal and a second terminal, wherein the first terminal is configured to provide a first data presenting panel layer to present data information; the second terminal is configured to provide a three-dimensional model presenting layer to present three-dimensional model information; the first data presenting panel layer and the three-dimensional model presenting layer communicate with each other through a support layer; and the data information is associated with the three-dimensional model information.

For example, in the presenting system provided by at least one embodiment of the present disclosure, the second terminal is further configured to provide a second data presenting panel layer, the second data presenting panel layer communicates with the first data presenting panel layer.

For example, in the presenting system provided by at least one embodiment of the present disclosure, the first data presenting panel layer and the three-dimensional model presenting layer communicate with each other through a WebSocket protocol.

At least one embodiment of the present disclosure provides an electronic device, comprising: a processor; and a memory, comprising one or more computer program instructions; wherein the one or more computer program instructions are stored in the memory, and when executed by the processor, the information presenting method according to any one of embodiments of the present disclosure is achieved.

At least one embodiment of the present disclosure provides a computer-readable storage medium which non-temporarily stores computer-readable instructions, wherein when the computer-readable instructions are executed by a computer, the computer executes the information presenting method according to any one of embodiments of the present disclosure.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIG. 1A shows a flow chart of an information presenting method provided by at least one embodiment of the present disclosure;

FIG. 3 shows a flow chart of another information presenting method provided by at least one embodiment of the present disclosure;

FIG. 4A shows an architecture diagram of a presenting system for applying the information presenting method provided by at least one embodiment of the present disclosure;

DETAILED DESCRIPTION

Figure 1B:
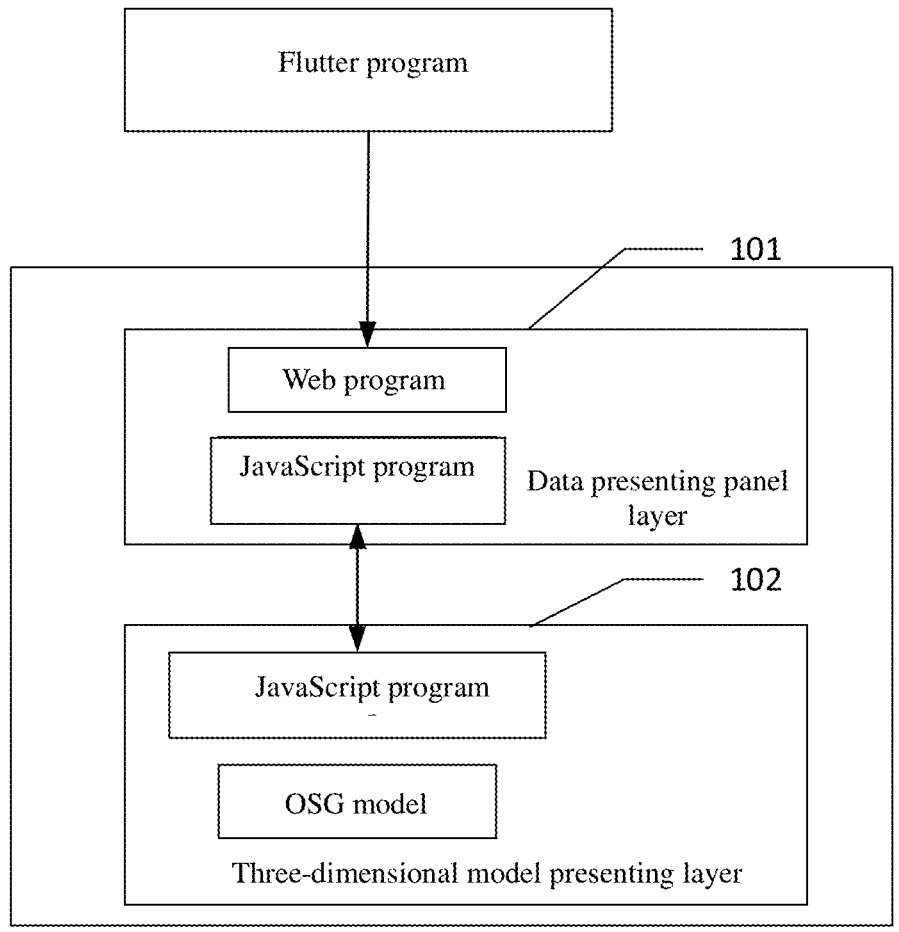
FIG. 1B shows a system architecture for applying the information presenting method provided by at least one embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Three-dimensional models enjoy exceptional advantages in presentation of smart cities, smart parks, and smart enterprises, etc. For example, the three-dimensional model has advantages of a shocking display effect, and an all-round, real and intuitive visual style with a sense of technology. For example, combining data of the smart city with the three-dimensional model can intuitively, vividly and concretely present scenes of the smart city, so that a user can grasp various situations of the smart city more quickly. However, in related technologies, it is very difficult to present (or display) a large amount of data of smart cities, smart parks, smart enterprises, etc., in combination with three-dimensional models, and the presentation effect is poor; in addition, it is very difficult to develop a system that combines data and three-dimensional model, and the development efficiency is low.

At least one embodiment of the present disclosure provides an information presenting method, a system thereof, an electronic device, and a computer-readable storage medium. The information presenting method includes: presenting data information in a data presenting panel layer; and presenting three-dimensional model information in a three-dimensional model presenting layer, the three-dimensional model presenting layer is different from the data presenting panel layer; the data presenting panel layer and the three-dimensional model presenting layer communicate with each other through a support layer, and the data information and the three-dimensional model information are associated with each other. The information presenting method can allow a user to conveniently view a scene presented by the three-dimensional model and the data information corresponding to the scene, which reduces operational complexity for the user to view the scene and the data corresponding to the scene. In addition, the method presents the data information and the three-dimensional model information through the data presenting panel layer and the three-dimensional model that communicate with each other, respectively, which reduces difficulty in simultaneously presenting the data information and the three-dimensional model information that are associated with each other, and improves development efficiency of the system for presenting the data information and the three-dimensional model information.

It should be noted that, in the following description, the embodiments of the present disclosure are illustrated by taking a smart city as an example, but it does not mean that the embodiments of the present disclosure are only applied to the smart city, and the embodiments of the present disclosure may also be applied to smart park, smart enterprise, smart village, etc. That is to say, application scenes of the embodiments of the present disclosure are not be limited in the present disclosure.

FIG. 1A shows a flow chart of an information presenting method provided by at least one embodiment of the present disclosure.

As shown in FIG. 1A, the method may include step S10 to step S20.

Step S10: presenting data information in a data presenting panel layer.

Step S20: presenting three-dimensional model 1 information in a three-dimensional model presenting layer, and the three-dimensional model presenting layer is different from the data presenting panel layer.

In this embodiment, the data presenting panel layer and the three-dimensional model presenting layer communicate with each other through a support layer; and the data information is associated with the three-dimensional model information.

In the embodiment of the present disclosure, the data presenting panel layer and the three-dimensional model presenting layer correspond to different software models. For example, the data presenting panel layer and the three-dimensional model presenting layer are different layers displayed on a display screen; and the different layers have a stacking visual effect when presented. The data presenting panel layer and the three-dimensional model presenting layer are not physical layers with physical bodies.

With respect to step S10, in some embodiments of the present disclosure, the data information may include population data, building data, vehicle data, pollutant data, ecological data, and other data of the smart city per se.

In other embodiments of the present disclosure, the data information may further include panel information in addition to the data of the smart city per se; and the panel information may include, for example, menu bar, button, text, icon, etc.

In some embodiments of the present disclosure, for example, the data presenting panel layer is configured to provide a User Interface (UI). For example, the data presenting panel layer may provide a two-dimensional user interface or may provide a three-dimensional user interface. The data presenting panel layer may be developed by using user interface development tool or user interface development framework.

In some embodiments of the present disclosure, for example, the data presenting panel layer is obtained based on a cross-platform interface development framework. Using the cross-platform interface development framework to develop the data presenting panel layer may allow the data presenting panel layer to be applied to various platforms or operating systems, thereby improving applicability and transferability of the data presenting panel layer. These platforms include, but are not limited to, Android, IOS, Windows, Linux, and other operating systems.

For example, the data presenting panel layer may be obtained based on Flutter. Flutter is a cross-platform development framework, which adopts Dart as a development language, and supports a plurality of development platforms (i.e., operating systems) such as Android, iOS, Linux, Web, and Windows.

For example, the data presenting panel layer is obtained by converting a panel program developed based on the Flutter.

In some embodiments of the present disclosure, the data presenting panel layer is a panel layer supported by a browser or a panel layer supported by an operating system.

For example, the Web program is a program supported by a browser, so the data presenting panel layer may be constructed by the Web program.

For example, the data presenting panel layer is a panel layer supported by an application program of the operating system.

For example, the Windows program is a program supported by an application program of the Windows operating system, so the data presenting panel layer may also be constructed by the Windows program, so that the data presenting panel layer is run in the application program of the Windows operating system.

The data presenting panel layer constructed by the Web program, the Windows program, the Android program, the IOS program, etc., may be obtained by converting the panel program developed based on the Flutter.

In some embodiments of the present disclosure, a developer may determine which type of program the panel program developed based on the Flutter is converted into according to the type of the operating system running the data presenting panel layer, so that the data presenting panel layer may run in the operating system.

Advantages of Flutter lie in quickness and cross-platform performance thereof. Flutter may run on various operating systems such as Android, IOS, Web, Windows, Mac, Linux, etc.; and through a command line tool provided by Flutter, a Flutter program may be easily converted into a Web program and a Window form program.

With respect to step S20, the three-dimensional model information may be, for example, a three-dimensional model established for a smart city. For example, the three-dimensional model may be obtained by using a design tool of the three-dimensional model to construct a smart city according to a preset scaling ratio. The three-dimensional model can intuitively and truly reflect an appearance of the smart city. For example, the three-dimensional model information can not only reflect geographic locations of a plurality of streets, a plurality of buildings, and green vegetation, etc., in the smart city, but also truly reflect streetscape, architectural style, and types of green vegetation in the smart city.

In some embodiments of the present disclosure, the three-dimensional model information presented by the three-dimensional model presenting layer may be a complete three-dimensional model of the smart city or may be a portion of three-dimensional model in the complete three-dimensional model of the smart city. For example, the three-dimensional model presenting layer may present three-dimensional images of buildings under construction, three-dimensional images of green vegetation, etc., in the complete three-dimensional model. For another example, the three-dimensional model presenting layer may present three-dimensional images of some streets and some residential districts in the complete three-dimensional model.

In some embodiments of the present disclosure, the three-dimensional model information presented by the three-dimensional model presenting layer may be presented according to control information input by a user or an operation of the user. For example, if the control information input by the user is a street A, the three-dimensional model information presented by the three-dimensional model presenting layer may be the street A and a surrounding region thereof. For another example, if the user performs an enlargement operation on a position C in the three-dimensional model, the three-dimensional model presenting layer presents a three-dimensional image corresponding to the enlarged position C. For another example, according to a rotation operation performed by the user on the three-dimensional model, the three-dimensional model is rotated to adjust a presentation angle of the three-dimensional model.

In some embodiments of the present disclosure, the three-dimensional model presenting layer may be developed based on a native code.

For example, the three-dimensional model presenting layer is developed based on the native code OpenScene-Graph (OSG). OSG is an open-source, cross-platform graphics development package designed for development of high-performance graphics application programs such as aircraft simulation, games, virtual reality, and scientific computing visualization. OSG provides an object-oriented framework on top of an Open Graphics Library (OpenGL), thereby freeing a developer from the calls to implement and optimize low-level graphics; in addition, OSG provides a lot of additional utilities for rapid development of graphics application programs.

In some embodiments of the present disclosure, for example, the three-dimensional model presenting layer is developed based on OSG, and the data presenting panel layer is a Web program or a Windows program obtained by conversion based on Flutter. Using OSG and Flutter to respectively develop the three-dimensional model presenting layer and the data presenting panel layer, can not only improve development efficiency, but also improve a presentation effect of the three-dimensional model.

The three-dimensional model presenting layer may also be developed by using other tools, and a development method of the three-dimensional model presenting layer will not be limited by the present disclosure. For example, the three-dimensional model presenting layer may also be developed based on ThreeJs. ThreeJs is a technology based on a browser, and the three-dimensional model is loaded and run in the browser, performance of the three-dimensional model is limited by the browser, and it is difficult for the three-dimensional model presenting layer to run a large-scale three-dimensional model based on ThreeJs. The OSG framework is a kind of native code, the three-dimensional model presenting layer based on the OSG framework may run on Web and Windows, and is not limited to being loaded and running in the browser, so that the three-dimensional model presenting layer based on the OSG framework can smoothly run a large-scale three-dimensional model.

In some embodiments of the present disclosure, the support layer includes a program for providing a communication service to the data presenting panel layer and the three-dimensional model presenting layer. For example, the support layer provides at least one communication mode among modes such as the Windows form message, function call, JavaScript call, WebSocket protocol, Http protocol, TCP protocol, UDP protocol, etc.

Communication by means of the Windows form message, the function call, etc., does not require additional development of programs for communication, which can improve development efficiency.

The WebSocket protocol is capable of implementing remote communication between the data presenting panel layer and the three-dimensional model presenting layer, and supporting communication between a plurality of forms (e.g., Web applications, Windows applications, and mobile applications), so that the data presenting panel layer and the three-dimensional model presenting layer do not need to be set on the same terminal, and there is no requirement for forms of the data presenting panel layer and the three-dimensional model presenting layer, thus improving transferability and flexibility of the data presenting panel layer and the three-dimensional model presenting layer.

In some embodiments of the present disclosure, a program for providing communication service included in the support layer that, for example, may be respectively deployed in the data presenting panel layer and the three-dimensional model presenting layer, so that the data presenting panel layer and the three-dimensional model presenting layer communicate with each other through the program providing the communication service.

In some embodiments of the present disclosure, the data presenting panel layer is deployed in a first container of the support layer, and the three-dimensional model presenting layer is deployed in a second container of the support layer. That is, the data presenting panel layer runs in the first container, and the three-dimensional model presenting layer runs in the second container.

For example, creating the first container and the second container in the support layer. The first container is configured to load the data presenting panel layer, and the second container is configured to load the three-dimensional model presenting layer, that is, the data presenting panel layer runs in the first container, and the three-dimensional model presenting layer runs in the second container.

For example, the support layer includes a window form program; and the first container and the second container are created in the window form program. For example, the window form program is the Windows form program.

For example, any one of the first container and the second container may be a Windows Presentation Foundation (WPF) container, or a container created by using the C++ language.

For example, the three-dimensional model presenting layer is an OSG model established based on the OSG framework, the second container is a WPF container, and the OSG model is loaded through the WPF container, so that the OSG model runs in the second container.

For another example, the data presenting panel layer is a Web program, the first container is a WPF container, and the Web program is loaded through the WPF container, so that the data presenting panel layer based on the Web program runs in the first container.

For example, the first container and the second container are deployed in the same Windows form; and the data presenting panel layer and the three-dimensional model presenting layer may communicate in communication modes such as a Windows form message, a function call, a JavaScript call, the WebSocket protocol, the Http protocol, the TCP protocol, the UDP protocol, etc. The first container and the second container are deployed in the same Windows form, so that the data presenting panel layer and the three-dimensional model presenting layer are provided on the same page, which can facilitate the user to control flexibly.

For another example, the first container is deployed in the Android form of the first terminal, and the second container is deployed in the Windows form of the second terminal, then the first container and the second container may communicate with each other in a network communication mode such as the WebSocket protocol, etc. This mode may allow the data presenting panel layer and the three-dimensional model presenting layer to be deployed on different terminals, and has a wide application scope.

For another example, the first container is deployed in one Windows form of the terminal, and the second container is deployed in another Windows form of the terminal. Stacking the two Windows forms of the two terminals may allow the data presenting panel layer and the three-dimensional model presenting layer to be stacked.

In the present disclosure, the container is a technology for packaging and running application programs such as Windows and Linux, etc.; the container may provide an isolated environment for application in a software running environment, making the application easier to develop, deploy and manage. For example, the container may be started and stopped quickly, so it is applicable to application that needs to quickly adapt to changing requirements. For example, the container is used to run application programs on a host operating system. For example, the container may be built on a kernel of the host operating system. Implementation and operation modes of the container will not be limited in the present disclosure. For example, the container may run within an application program to isolate and control another set of application programs.

FIG. 1B shows a system architecture for applying the information presenting method provided by at least one embodiment of the present disclosure.

As shown in FIG. 1B, the system architecture includes a data presenting panel layer 101 and a three-dimensional model presenting layer 102.

The data presenting panel layer 101 is obtained by converting a program developed by Flutter into a Web program. The three-dimensional model presenting layer 102 is implemented by using WPF to load the OSG model. By adding WebView in WPF, the data presenting panel layer 101 (Web) and the three-dimensional model presenting layer 102 are combined, and interaction between the data presenting panel layer 101 and the three-dimensional model presenting layer 102 is implemented by using the JavaScript or WebSocket protocol.

As shown in FIG. 1B, the program for providing communication service included in the support layer may be a JavaScript program. The JavaScript program is respectively deployed in the data presenting panel layer and the three-dimensional model presenting layer, so that the data presenting panel layer and the three-dimensional model presenting layer communicate with each other by providing the JavaScript program.

It may be understood that the JavaScript program is only an example of program that provides the communication service, and the program for providing communication service included in the support layer is not limited to the JavaScript program in the present disclosure.

In some embodiments of the present disclosure, the data information and the three-dimensional model information being associated with each other, includes: in response to a change in the three-dimensional model information presented by the three-dimensional model presenting layer, the data information presented by the data presenting panel layer being updated; and/or in response to a change in the data information presented by the data presenting panel layer, the three-dimensional model information presented by the three-dimensional model presenting layer being updated.

For example, at a first moment, the three-dimensional model in the three-dimensional model presenting layer presents a street A in a city; at this time, the data information presented in the data presenting panel layer is traffic light distribution information on the street A, and information of residential districts around the street A, etc. At a second moment, the user rotates the three-dimensional model and adjusts the three-dimensional model from presenting the street A in the city to presenting a street B in the city; at this time, the data information presented on the data presenting panel layer is updated with the change of the three-dimensional model; and the data information presented on the data presenting panel layer is updated to traffic light distribution information on the street B, and information of residential districts around the street B, etc.

For another example, if the data information presented on the data presenting panel layer changes from urban greening vegetation data to urban construction building data, the three-dimensional model information presented by the three-dimensional model presenting layer is also updated from a three-dimensional image of green vegetation to a three-dimensional image of construction buildings.

In some embodiments of the present disclosure, the data presenting panel layer and the three-dimensional model presenting layer are provided on the same page to present the data information and the three-dimensional model information. Providing the data presenting panel layer and the three-dimensional model presenting layer on the same page improves convenience for a user to view the data information and the three-dimensional model information. For example, the user does not need to switch pages to respectively view the data information and the three-dimensional model information. The user may view the data information and the three-dimensional model information on the same page at the same time, which is convenient for the user to compare and analyze, and improves user experience.

In some embodiments of the present disclosure, the page may be presented as a window form. For example, the page is presented as a Window Form. For another example, the page is a Web page. A specific form of the page will not be limited in the present disclosure. The page is presented as a Window form, which is convenient for the user to operate and edit flexibly and has a wide range of support and application.

In some embodiments of the present disclosure, the data presenting panel layer and the three-dimensional model presenting layer are stacked on a page to present the data information and the three-dimensional model information.

For example, the data presenting panel layer is closer to a viewer than the three-dimensional model presenting layer; and the data presenting panel layer is at least partially set to be transparent or translucent to reveal at least a portion of the three-dimensional model presenting layer covered by the data presenting panel layer.

In some embodiments of the present disclosure, for example, the window form program of the support layer allows the support layer to be presented in the page in a form of a base layer.

In this embodiment, the support layer is presented in the page in the form of the base layer; and the data presenting panel layer and the three-dimensional model presenting layer are stacked on the base layer.

For example, the page is displayed as a window form, and the support layer is displayed in the window form of the base layer.

For example, the base layer may serve as a background for the data presenting panel layer and the three-dimensional model presenting layer. For example, the base layer may be a panel with uniform gray values, or the base layer may also include some unchangeable texts, images, etc.

For example, the three-dimensional model presenting layer is located between the base layer and the data presenting panel layer, and a distance from the base layer to the viewer is greater than a distance from the data presenting panel layer to the viewer. For example, coverage of the base layer in the page may be the same as the coverages of the three-dimensional model presenting layer and the data presenting panel layer, the base layer may be covered or hidden by the three-dimensional model presenting layer and the data presenting panel layer, and the viewer does not need to see the support layer. For another example, the coverage of the base layer in the page is greater than the coverages of the three-dimensional model presenting layer and the data presenting panel layer.

In other embodiments of the present disclosure, the data presenting panel layer and the three-dimensional model presenting layer are respectively provided in different regions of the page, so as to respectively present the data information and the three-dimensional model information through different regions.

Figure 2A:
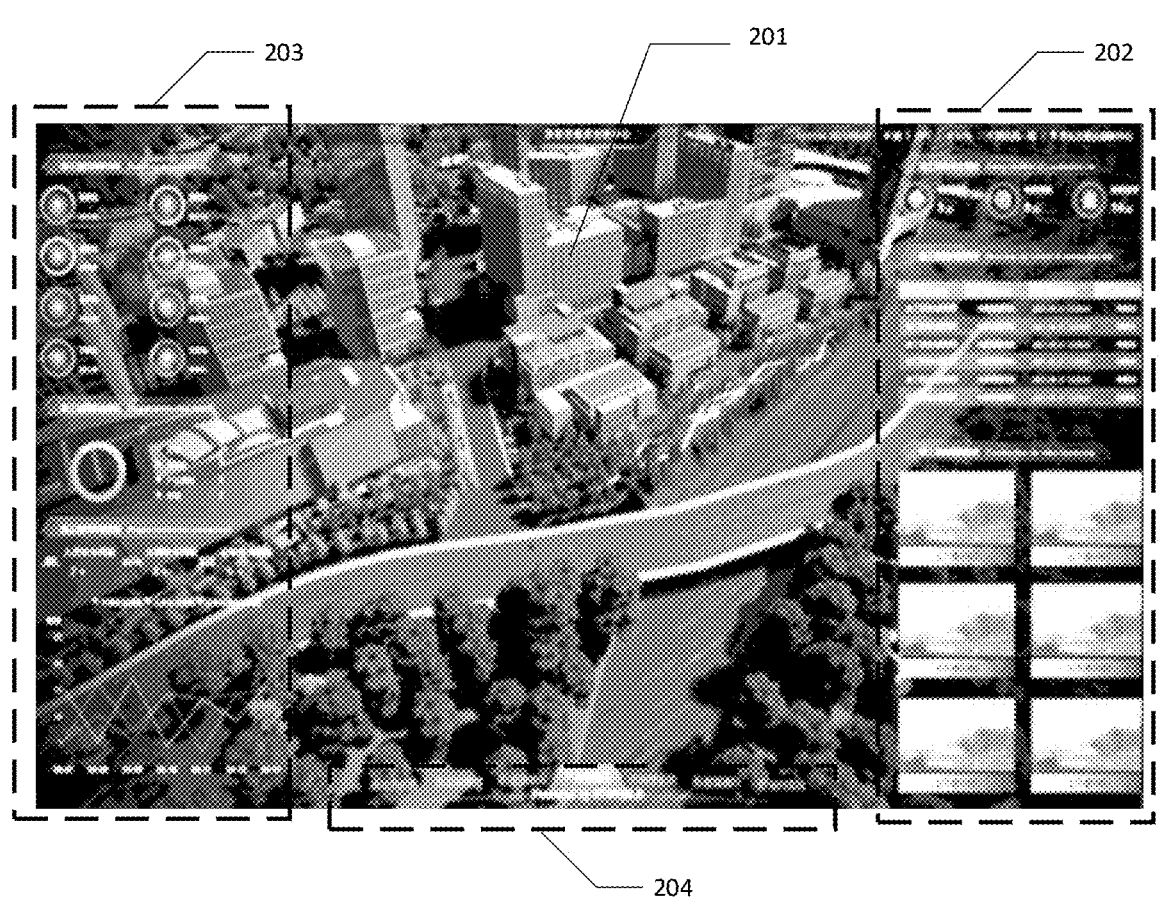
FIG. 2A shows a schematic diagram of presenting data information and three-dimensional model information in the same page provided by at least one embodiment of the present disclosure.

FIG. 2A is a schematic diagram showing that a data presenting panel layer and a three-dimensional model presenting layer are provided on the same page to present data information and three-dimensional model information provided by at least one embodiment of the present disclosure.

As shown in FIG. 2A, the three-dimensional model presenting layer and the data presenting panel layer are stacked on the same page to present the data information and the three-dimensional model information.

Stacking the three-dimensional model presenting layer and the data presenting panel layer can increase a presentation area of the three-dimensional model information and the data information in a display screen, and further improve user experience.

For example, the data presenting panel layer is overlaid on the three-dimensional model presenting layer, that is, the data presenting panel layer is closer to a viewer than the three-dimensional model presenting layer. Three-dimensional model information 201 presented by the three-dimensional model presenting layer and the data information (e.g., data information 202, data information 203, and data information 204) presented by the data presenting panel layer are displayed on the page 200.

For example, what is currently presented by the three-dimensional model information 201 is a three-dimensional image composed of a main road and surrounding buildings, green vegetation, etc., of the main road.

For example, the data information may include the data information 202 located on a right side of the page 200, and the data information 202 may include, for example, landscape maps of different sections of the main road, risk indicators of construction sites, etc. The data information may also include the data information 203 located on a left side of the page 200, and the data information 203 may include, for example, progress distribution of construction projects, vehicle safety risks, facility safety risks, personnel safety risks, etc. The data information may also include the data information 204 located at the bottom of the page 200; the data information 204 is, for example, panel information, and the panel information provides various operation controls, and these operation controls may be selected by the user and present different information according to the user's selection operation.

In some embodiments of the present disclosure, as shown in FIG. 2A, the data presenting panel layer is closer to the viewer than the three-dimensional model presenting layer; and the data presenting panel layer is at least partially set to be transparent or translucent to reveal at least a portion of the three-dimensional model presenting layer.

Because the data presenting panel layer and the three-dimensional model presenting layer are stacked, it is necessary to process the Web program or Windows form program converted by Flutter, so that at least a portion of the data presenting panel layer is at least partially set to be transparent or translucent to reveal at least a portion of the three-dimensional model presenting layer covered by the data presenting panel layer.

For example, the process of processing the Web program includes: adding, in a document node of index.html, a CSS style to an <html> node and a <body> node, and setting background thereof to be transparent.

For example, the process of performing background transparency on the Windows form program includes:

1) Generating relevant C++ codes of a corresponding Windows form container, and processing some codes related to the window form in the C++ codes to make the data presenting panel layer transparent. For example, before converting the Flutter program into the Windows form program, Flutter project automatically generates the relevant C++ code of the corresponding Windows form container after the Flutter program is determined to be applied to Windows form according to the user.

2) Modifying, in the win32_windows.cpp file, a third parameter of calling the CreateWindow function to WS_POPUPIWS_VISIBLEIWS_SYSMENU, and setting the Windows form to a style of no border, no menu bar, and no title bar.

3) Setting, in the main.cpp file, the window form to be transparent by adding a call to UpdateLayered Window( ).

In some embodiments of the present disclosure, for example, after modification of the Web program is completed, a JavaScript program or a WebSocket program is added to index.html for interaction between Web and WPF, and a set of new Web programs is finally formed.

Figure 2B:
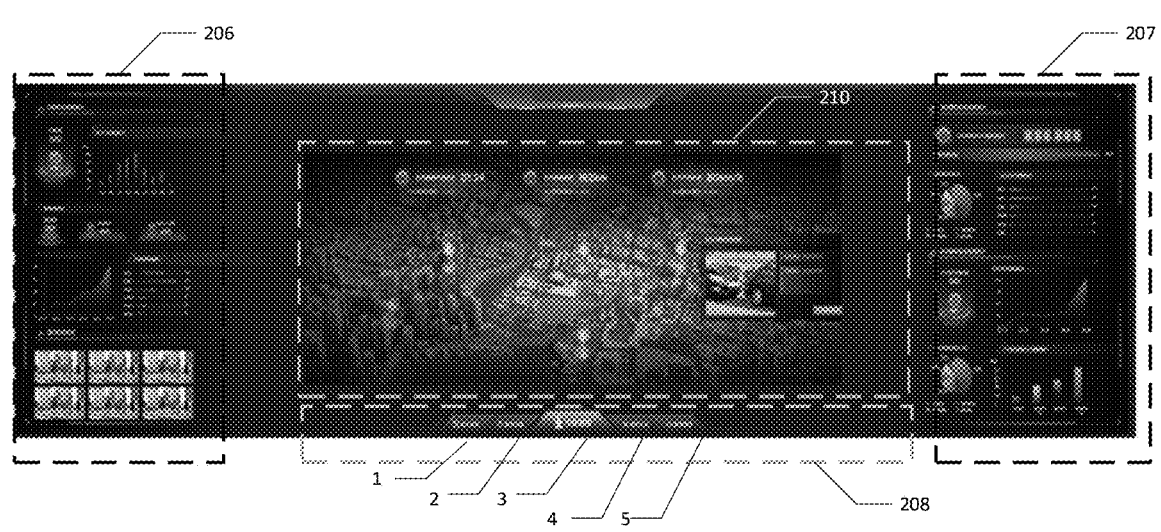
FIG. 2B shows another schematic diagram of presenting the data information and the three-dimensional model information in the same page provided by at least one embodiment of the present disclosure.

FIG. 2B shows another schematic diagram that a data presenting panel layer and a three-dimensional model presenting layer are provided on the same page to present data information and three-dimensional model information provided by at least one embodiment of the present disclosure.

As shown in FIG. 2B, the data presenting panel layer and the three-dimensional model presenting layer are respectively provided in different regions of the page 300 to respectively present the data information and the three-dimensional model information through different regions.

The three-dimensional model presenting layer and the data presenting panel layer are respectively provided in different regions of the page 300; and a presentation effect of the three-dimensional model information and the data information is clear.

For example, the three-dimensional model presenting layer is provided in a central region 210 of the page 300, and the data presenting panel layer is provided in other regions of the page 300 except the central region 210. For example, a region where the data presenting panel layer is located surrounds the central region 210.

As shown in FIG. 2B, the three-dimensional model presenting layer presents the three-dimensional model information in the central region 210. The data presenting panel layer presents data information 206 in a left region of the page 300, and presents data information 207 in a right region of the page 300, and a bottom of the page 300 is a panel information region 208 for presenting panel information.

The content of the three-dimensional model information 205 and the data information may be referred to the above description of FIG. 2A.

The panel program developed by Flutter that is converted into a Web program or a Windows program, and subjected to a small amount of modification, may serve as the data presenting panel layer of the solution; the OSG model that is loaded through WPF, serves as the three-dimensional model presenting layer of the present disclosure; and finally the two layers are combined (e.g., stacked), so as to implement the presenting system for applying the presenting method. The embodiments of the present disclosure can improve efficiency of developing a presenting system such as smart city, and rapidly construct a presenting system for smart city. In addition, the data presenting panel layer and the three-dimensional model presenting layer according to the embodiments of the present disclosure may be deployed separately on different terminals. As shown in FIG. 1A, the information presenting method may further include step S30 and step S40.

Step S30: receiving control information.

Step S40: synchronously adjusting the data information presented in the data presenting panel layer and the three-dimensional model information presented in the three-dimensional model presenting layer according to the control information.

In this embodiment, the control information may synchronously adjust the data information presented in the data presenting panel layer and the three-dimensional model information presented in the three-dimensional model presenting layer, so that the presented data information corresponds to the three-dimensional model information, which is convenient for the viewer to view the three-dimensional model information and the data information at the same time.

In some embodiments of the present disclosure, for example, the data presenting panel layer and/or the three-dimensional model presenting layer directly receives the control information.

For example, the data presenting panel layer is provided with an operation control, and the operation control allows the user to input the control information; or, the data presenting panel layer directly receives the control information from an operation terminal program.

For another example, the three-dimensional model presenting layer directly receives the control information from the operation terminal program.

Communication efficiency is relatively high in the case where the data presenting panel layer and the three-dimensional model presenting layer directly receive the control information.

In other embodiments of the present disclosure, the data presenting panel layer and the three-dimensional model presenting layer receive the control information through the support layer.

Receiving the control information through the support layer enables the data presenting panel layer and the three-dimensional model presenting layer to synchronously respond to the control information, and no additional communication device for developing the data presenting panel layer and the three-dimensional model presenting layer to communicate with the operation terminal is needed, thus improving the development efficiency.

For example, in the system architecture shown in FIG. 1B, the data presenting panel layer and the three-dimensional model presenting layer are respectively deployed with a JavaScript program provided by the support layer, then the data presenting panel layer and the three-dimensional model presenting layer may receive the control information through the JavaScript program.

For another example, a WebSocket server is deployed in the support layer; and the control information from the WebSocket client is received through the WebSocket server.

In some embodiments of the present disclosure, the control information is provided by an operation terminal. The operation terminal refers to software or a program that provides the control information. For example, the data presenting panel layer and the three-dimensional model presenting layer are deployed in the same terminal, and the operation terminal is also deployed in the terminal; and the operation terminal in the terminal acquires the control information, and provides the control information to the data presenting panel layer and the three-dimensional model presenting layer.

For another example, the data presenting panel layer and the three-dimensional model presenting layer are deployed in the same terminal, the operation terminal is deployed in another terminal. The operation terminal of the another terminal acquires the control information, and send the control information to the terminal where the data presenting panel layer and the three-dimensional model presenting layer are located, so as to provide the control information to the terminal where the data presenting panel layer and the three-dimensional model presenting layer are located.

The operation terminal may communicate with the data presenting panel layer and the three-dimensional model presenting layer in communication modes such as the Http protocol, the TCP protocol, the WebSocket protocol, the UDP protocol, etc., so as to provide the control information.

In some embodiments of the present disclosure, the control information is acquired by the data panel layer provided in the operation terminal.

The data panel layer may be deployed in a terminal different from that of the above-described data presenting panel layer; or, the data panel layer may also be deployed in the same terminal as that of the above-described data presenting panel layer.

For example, the data panel layer provides a control interface through which the user may input the control information for the data presenting panel layer and the three-dimensional model presenting layer.

For example, the data panel layer in the operation terminal generates the control information in response to the user's input operation, so as to provide the control information to the data presenting panel layer and the three-dimensional model presenting layer.

In other embodiments of the present disclosure, the data presenting panel layer is further provided with an operation control to allow the user to input the control information.

As shown in FIG. 2A and FIG. 2B, the data presenting panel layer includes a panel information region; and operation controls (e.g., buttons, input boxes, etc.) may be provided in the panel information region to allow the user to input the control information.

As shown in FIG. 2B, an operation control 1, an operation control 2, an operation control 3, an operation control 4, and an operation control 5 are provided in the panel information region 208. The user may perform a selection operation on the operation control 1, the operation control 2, the operation control 3, the operation control 4, and the operation control 5 to input the control information. The data presenting panel layer may communicate with the three-dimensional model presenting layer in a communication mode supported by the support layer, so that the three-dimensional model presenting layer and the data presenting panel layer may synchronously adjust the three-dimensional model information and the data information.

FIG. 3 shows a flow chart of another information presenting method provided by at least one embodiment of the present disclosure.

As shown in FIG. 3, the method may further include step S50 and step S60 on the basis of the foregoing step S10 and step S20. Step S50 and step S60 are executed, for example, before step S10.

Step S50: providing a data presenting panel layer in a first terminal.

Step S60: providing a three-dimensional model presenting layer in a second terminal.

In this embodiment, the support layer is deployed in the first terminal and/or the second terminal; and data information and three-dimensional model information are simultaneously presented in the first terminal and the second terminal.

In the method, the data presenting panel layer and the three-dimensional model presenting layer are deployed in different terminals, which realizes separate deployment of the data presenting panel layer and the three-dimensional model presenting layer. In addition, the data presenting panel layer and the three-dimensional model presenting layer may communicate with each other through the support layer, and the three-dimensional model presenting layer may be remotely controlled by using the data presenting panel layer.

The present disclosure provides a presenting system for applying the information presenting method as described in FIG. 3. The presenting system includes a first terminal and a second terminal; the first terminal is configured to provide a first data presenting panel layer to present data information; the second terminal is configured to provide a three-dimensional model presenting layer to present three-dimensional model information; the first data presenting panel layer and the three-dimensional model presenting layer communicate with each other through the support layer; and the data information and the three-dimensional model information are associated with each other.

FIG. 4A shows an architecture diagram of a presenting system 400 for applying the information presenting method provided by at least one embodiment of the present disclosure.

As shown in FIG. 400, the presenting system 400 may include a terminal 401 and a terminal 402. The terminal 401 is an example of the first terminal; and the terminal 402 is an example of the above-described second terminal.

The terminal 401 is configured to provide a data presenting panel layer to present data information 411. The terminal 402 is configured to provide a three-dimensional model presenting layer to present three-dimensional model information 412. For convenience of distinction and description, the data presenting panel layer in the terminal 401 is referred to as the first data presenting panel layer.

The first data presenting panel layer and the three-dimensional model presenting layer communicate with each other through the support layer; and the data information and the three-dimensional model information are associated with each other.

For example, the terminal 401 may be various electronic devices having a display screen, including but not limited to, mobile phone, tablet computer, portable computer, desktop computer, smart television, wearable device, etc.

For example, the terminal 402 may be various electronic devices having a display screen, including but not limited to, data visualization mobile terminal, desktop computer, smart television, etc.

For example, the terminal 401 and the terminal 402 may communicate with each other in a wired or wireless manner, for example, via WIFI, a mobile communication network (e.g., a communication network such as 3G/4G/5G), Zig-Bee, Bluetooth, etc.

A support layer (e.g., a Websocket program) may be deployed in the terminal 401 and the terminal 402, so that the terminal 401 and the terminal 402 communicate with each other through the support layer.

The data information presented by the first data presenting panel layer may include, for example, population data, building data, vehicle data, pollutant data, ecological data, and other data of the smart city per se.

The data information presented by the first data presenting panel layer may include, for example, panel information; and the panel information may include, for example, menu bar, button, text, icon, etc.

The description in FIG. 1A above may be referred to for specific embodiments of the data information and the three-dimensional model information.

In some embodiments of the present disclosure, in the presenting system 400 shown in FIG. 4A, the terminal 402 is further configured to provide a second data presenting panel layer; and the second data presenting panel layer and the first data presenting panel layer communicate with each other.

For example, the first data presenting panel layer and the second data presenting panel layer communicate with each other through the support layer.

In some embodiments of the present disclosure, the data information presented by the second data presenting panel layer may be the same as, or partially the same as, or completely different from the data information presented by the first data presenting panel layer.

For example, the data information presented by the first data presenting panel layer is the panel information that allows the user to perform an input operation; and the data information presented by the second data presenting panel layer is population data, building data, vehicle data, pollutant data, ecological data, and other data of the smart city per se.

For another example, the data information presented by the first data presenting panel layer includes the panel information and the data of the smart city per se; and the data information presented by the second data presenting panel layer only includes the data of the smart city per se and a portion of the panel information.

Figure 4B:
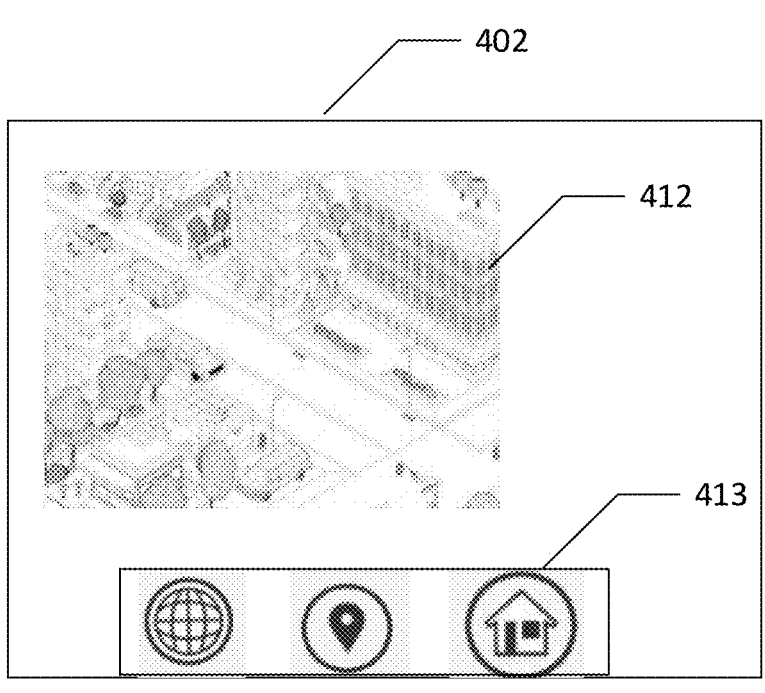
FIG. 4B shows a schematic diagram of providing a second data presenting panel layer by a terminal 402 in FIG. 4A provided by at least one embodiment of the present disclosure.

FIG. 4B shows a schematic diagram of providing a second data presenting panel layer by a terminal 402 in FIG. 4A provided by at least one embodiment of the present disclosure.

As shown in FIG. 4B, the terminal 402 provides a three-dimensional model presenting layer to present three-dimensional model information 412. In addition, a second data presenting panel layer is further provided to present data information 413.

The present disclosure further provides another presenting system for applying the information presenting method. The presenting system includes a first terminal, the first terminal is configured to provide a first data presenting panel layer to present data information, and is configured to provide a three-dimensional model presenting layer to present three-dimensional model information, the three-dimensional model presenting layer is different from the first data presenting panel layer; the first data presenting panel layer and the three-dimensional model presenting layer communicate with each other through the support layer, and the data information and the three-dimensional model information are associated with each other.

Figure 5A:
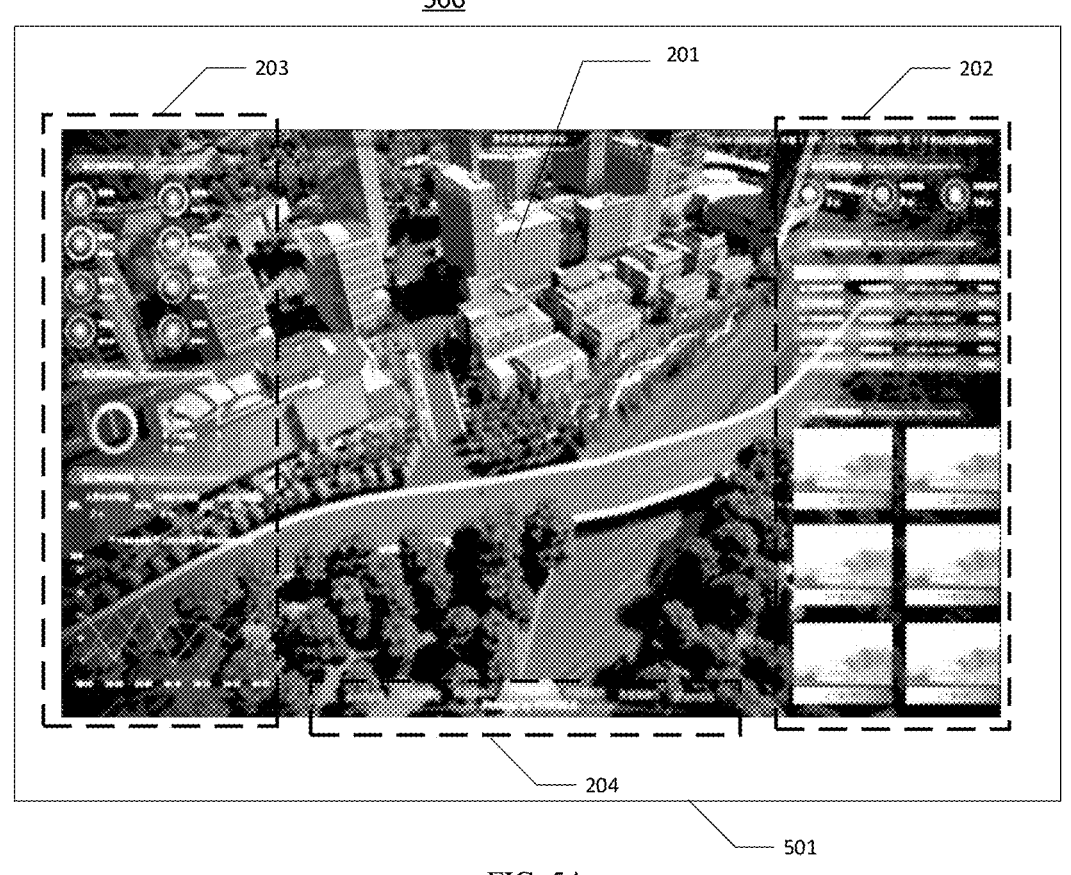
FIG. 5A shows an architecture diagram of a presenting system for applying the information presenting method provided by at least one embodiment of the present disclosure.

FIG. 5A shows an architecture diagram of a presenting system 500 for applying the information presenting method provided by at least one embodiment of the present disclosure.

As shown in FIG. 5A, the presenting system 500 includes a terminal 501; and the terminal 501 is an example of the first terminal.

The terminal 501 provides a data presenting panel layer to present data information (data information 202, data information 203 and data information 204), and provides a three-dimensional model presenting layer to present the three-dimensional model information 201. The first data presenting panel layer and the three-dimensional model presenting layer communicate with each other through the support layer. The data presenting panel layer provided by the terminal 501 is referred to as a first data presenting panel layer.

For example, the first data presenting panel layer and the three-dimensional model presenting layer may be configured to be distributed in different regions of the page, so that the data information and the three-dimensional model information are presented in different regions of the page.

For another example, the first data presenting panel layer and the three-dimensional model presenting layer are stacked; the first data presenting panel layer is closer to a viewer than the three-dimensional model presenting layer; and the data presenting panel layer is at least partially set to be transparent or translucent to reveal at least a portion of the three-dimensional model presenting layer.

In some embodiments of the present disclosure, for example, in the presenting system 500 shown in FIG. 5A, the presenting system 500 may further include a second terminal; the second terminal is configured to provide a second data presenting panel layer; and the second data presenting panel layer and the first data presenting panel layer communicate with each other.

Figure 5B:
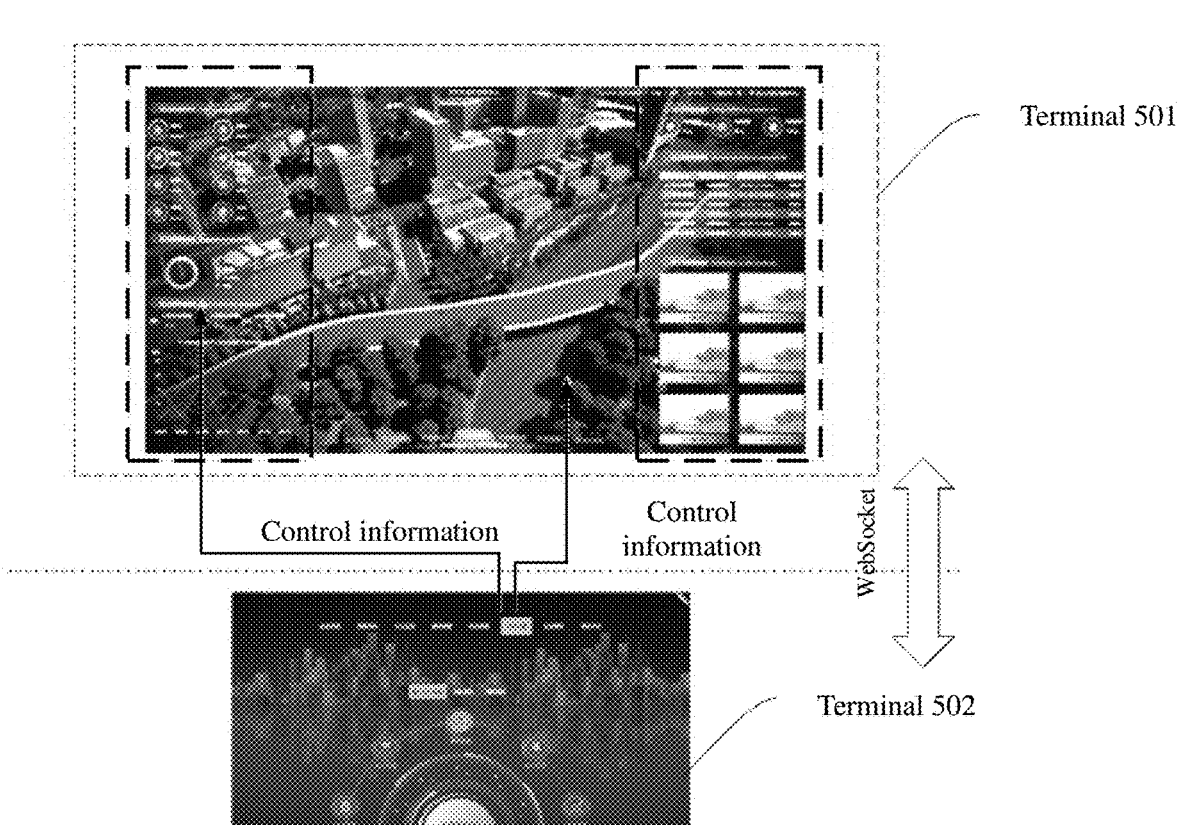
FIG. 5B shows a schematic diagram of a presenting system including a first terminal and a second terminal provided by at least one embodiment of the present disclosure.

FIG. 5B shows a schematic diagram of a presenting system 500 including a first terminal and a second terminal provided by at least one embodiment of the present disclosure.

As shown in FIG. 5B, the presenting system 500 includes a terminal 502 in addition to the terminal 501. Terminal 502 is an example of the second terminal.

The terminal 502 provides a second data presenting panel layer; and the second data presenting panel layer and the first data presenting panel layer communicate with each other. For example, the terminal 501 and the terminal 502 may communicate with each other in a wired or wireless manner, for example, through WIFI, a mobile communication network (e.g., a communication network such as 3G/4G/5G), ZigBee, Bluetooth, etc.

The second data presenting panel layer includes, for example, an operation control. The operation control is clicked to generate control information, and then the control information is sent to the terminal 501, so that the first data presenting panel layer and the three-dimensional model presenting layer synchronously adjust the data information and the three-dimensional model information.

In some embodiments of the present disclosure, the data information presented by the second data presenting panel layer may be the same as, or partially the same as, or completely different from the data information presented by the first data presenting panel layer (i.e., the data information presented by the terminal 501).

For example, the data information presented by the second data presenting panel layer is panel information that allows a user to perform input operations; and the data information presented by the first data presenting panel layer is population data, building data, vehicle data, pollutant data, ecological data, and other data of the smart city per se.

For another example, the data information presented by the first data presenting panel layer includes a portion of the panel information and the data of the smart city per se; and the data information presented by the second data presenting panel layer only includes the data of the smart city per se and a portion of the panel information.

In this embodiment, for example, the second terminal 503 may be a user's mobile device; and the first terminal 501 is a large-screen terminal. The user may input the control information on the mobile device, so as to adjust the data information and the three-dimensional model presented on the first terminal, which is convenient for the user to compare and analyze the data information and the three-dimensional model.

For example, the second terminal 503 displays construction risk levels of respective regions in the smart city; and in response to the user's click operation on a "high construction risk level" icon displayed on the second terminal 503, the three-dimensional presentation model of the first terminal 501 presents a three-dimensional image of regions with a high construction risk level in the smart city, so that the user may quickly view distribution of the regions with a high construction risk level.

In other embodiments of the present disclosure, the presenting system may include a first terminal and a second terminal; the second terminal provides a three-dimensional model presenting layer to present the three-dimensional model; and the first terminal provides a three-dimensional model presenting layer and a data panel present layer, to present the three-dimensional model information and the data information in the second terminal.

Figure 5C:
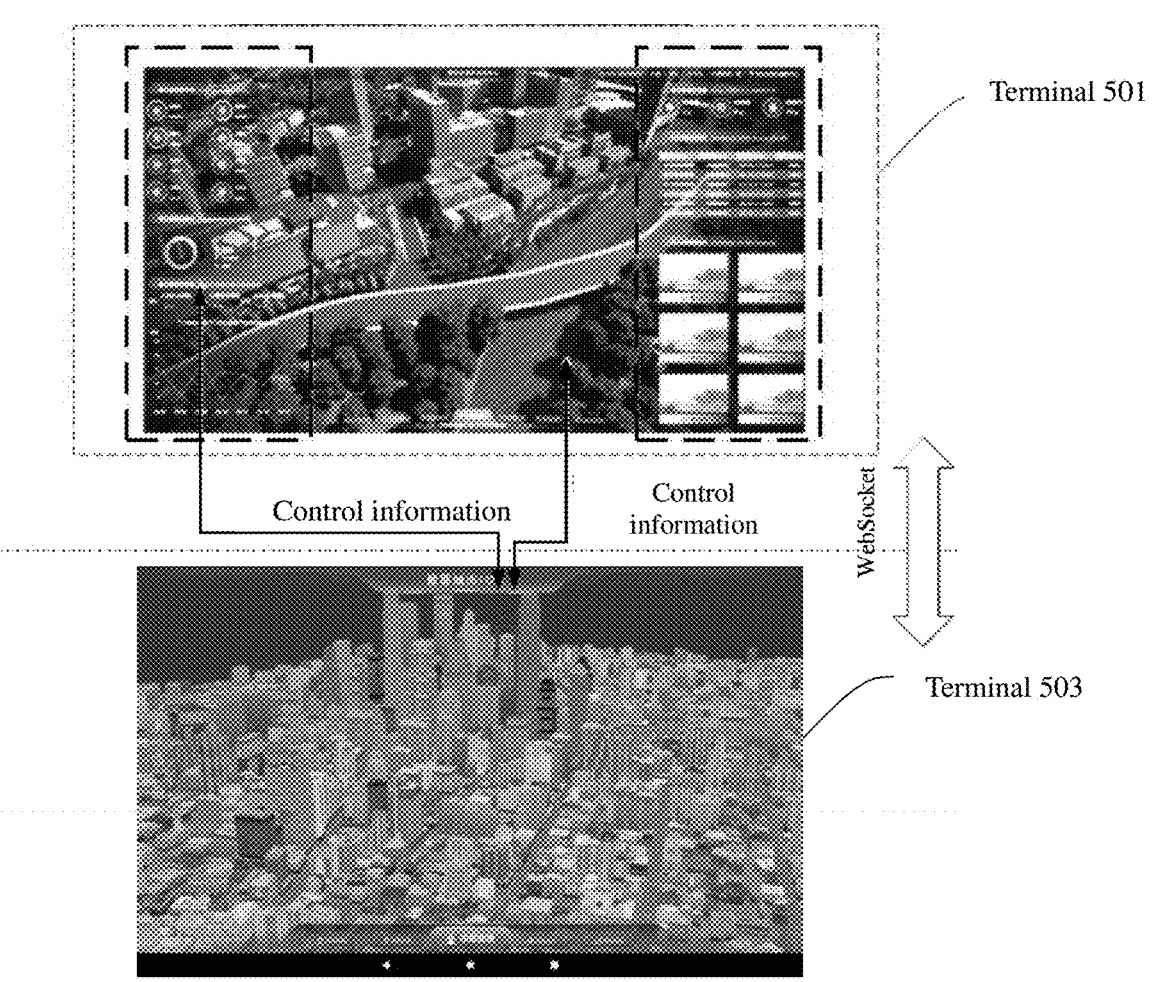
FIG. 5C shows a schematic diagram of another presenting system 500 including a first terminal and a second terminal provided by at least one embodiment of the present disclosure.

FIG. 5C shows a schematic diagram of another presenting system 500 including a first terminal and a second terminal provided by at least one embodiment of the present disclosure.

As shown in FIG. 5C, the presenting system 500 includes a terminal 503 in addition to the terminal 501. The terminal 503 is another example of the second terminal.

The terminal 503 provides a three-dimensional model presenting layer; and the three-dimensional model presenting layer communicates with the first data presenting panel layer in the terminal 501. For example, the terminal 501 and the terminal 502 may communicate with each other in a wired or wireless manner, for example, through WIFI, a mobile communication network (e.g., a communication network such as 3G/4G/5G), ZigBee, Bluetooth, etc.

The three-dimensional model presenting layer may include, for example, an operation control. The operation control is clicked to generate control information, and then the control information is sent to the terminal 501, so that the first data presenting panel layer and the three-dimensional model presenting layer synchronously adjust the data information and the three-dimensional model information.

For example, the second terminal 503 may be a user's mobile device; and the user performs, on the mobile device, operations such as rotating, zooming in, and zooming out, etc., on the three-dimensional model. When the user adjusts the three-dimensional model layer on the mobile device, the adjusted data information is synchronously presented on the first terminal 501.

For example, by operating the three-dimensional model on the mobile device, the three-dimensional model is made to present a three-dimensional image of a certain community, and the first terminal 501 (e.g., a large-screen terminal) may present information such as the number of patients with a certain disease in the community, the number of close contacts of the patient, the population of the community, the residential districts of the community, etc.

In this embodiment, the user may control the three-dimensional model so as to present the data information corresponding to the three-dimensional model on the large-screen terminal, which is convenient for the user to analyze the data.

In some embodiments of the present disclosure, with respect to the presenting system including the first terminal and the second terminal, the data presenting panel layer and the three-dimensional model presenting layer may communicate with each other through the WebSocket protocol.

Figure 6A:
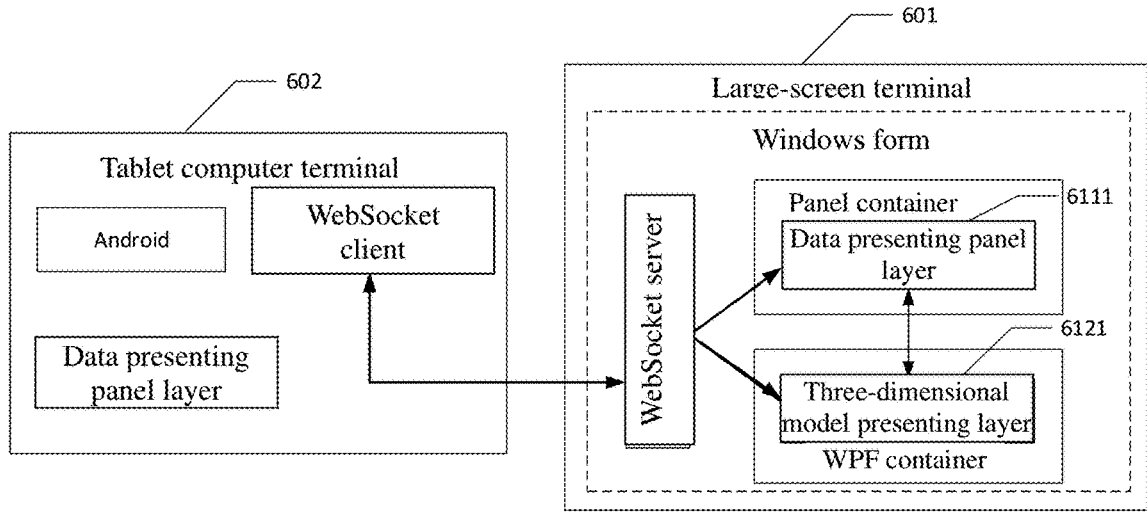
FIG. 6A shows an architecture diagram of a system communicating through the WebSocket protocol provided by at least one embodiment of the present disclosure.

FIG. 6A shows an architecture diagram of a system communicating through the WebSocket protocol provided by at least one embodiment of the present disclosure.

In the embodiment shown in FIG. 6A, by taking the first terminal as a large-screen terminal 601 and the second terminal as a tablet computer terminal 602, the system architecture communicating through the WebSocket protocol is illustrated.

As shown in FIG. 6A, the large-screen terminal 601 includes a Windows form; and the Windows form serves as a support layer. The support layer is deployed with a WebSocket server for communicating with the tablet computer terminal 602. A panel container and a WPF container are deployed in the Windows form; the panel container is configured to load the data presenting panel layer 6111; and the WPF container is configured to load the three-dimensional model presenting layer 6121.

The tablet computer terminal 602 may be, for example, an Android operating system; and the Android operating system may deploy a data presenting panel layer and a WebSocket client. The WebSocket client is configured to communicate with the WebSocket server.

The WebSocket server receives the control information from the WebSocket client, and sends the control information to the data presenting panel layer 6111 and the three-dimensional model presenting layer 6121, so that the data information presented by the data presenting panel layer 6111 and the three-dimensional model presented by the three-dimensional model presenting layer 6121 are adjusted synchronously.

The data presenting panel layer and the three-dimensional model presenting layer may communicate with each other in a mode such as the WebSocket protocol, and the function call, etc.

For example, the system is a presenting system of a smart city command center; while the user of the smart city command center may move freely, he/she may easily control presentation on the large-screen terminal 601 by inputting the control information to the tablet computer terminal 602, which improves operability for the user; in a case of multi-terminal agent linkage in a conference, it is convenient for users to perform linkage between chart information and three-dimensional data information.

Figure 6B:
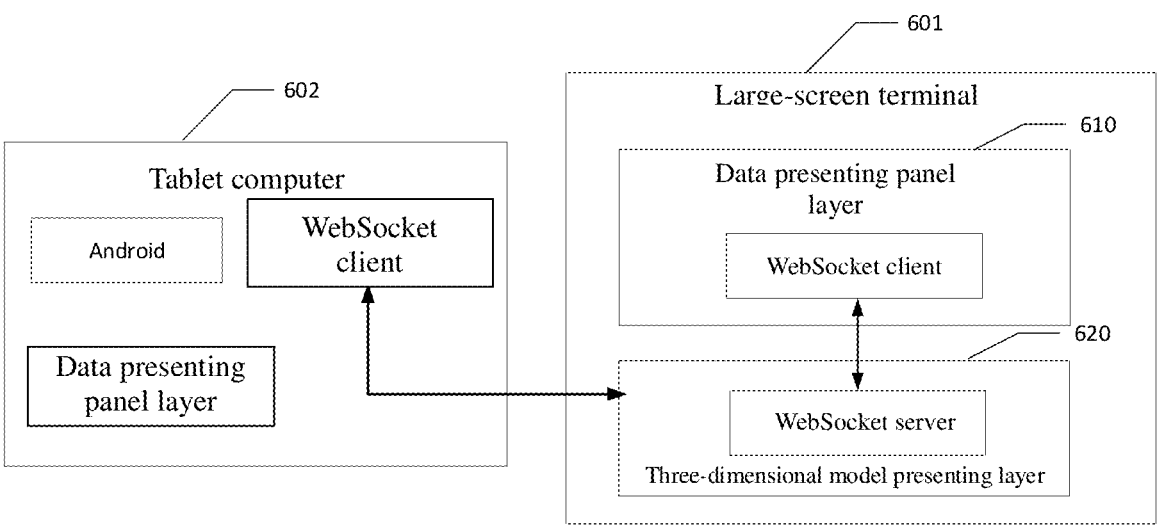
FIG. 6B shows an architecture diagram of another system communicating through the WebSocket protocol provided by at least one embodiment of the present disclosure.

FIG. 6B shows an architecture diagram of another system communicating through the WebSocket protocol provided by at least one embodiment of the present disclosure.

In the embodiment shown in FIG. 6B, a data presenting panel layer 610 and a three-dimensional model presenting layer 620 are deployed in the large-screen terminal 601.

A WebSocket client is deployed in the data presenting panel layer 610, and a WebSocket server is deployed in the three-dimensional model presenting layer 620, so that the data presenting panel layer 610 and the three-dimensional model presenting layer 620 may communicate with each other through WebSocket.

A user interface of the tablet computer terminal 602 may be implemented by an Android program to be applied to an Android operating system. The Android operating system may deploy a three-dimensional model presenting layer and a WebSocket client; and the three-dimensional model presenting layer is configured to present the three-dimensional model based on the OSG framework. The WebSocket client is configured to communicate with the WebSocket server.

The WebSocket server of the three-dimensional model presenting layer 620 is configured to monitor a connection request sent by the WebSocket client of the tablet computer terminal 602 and the WebSocket client of the data presenting panel layer 610.

Figure 6C:
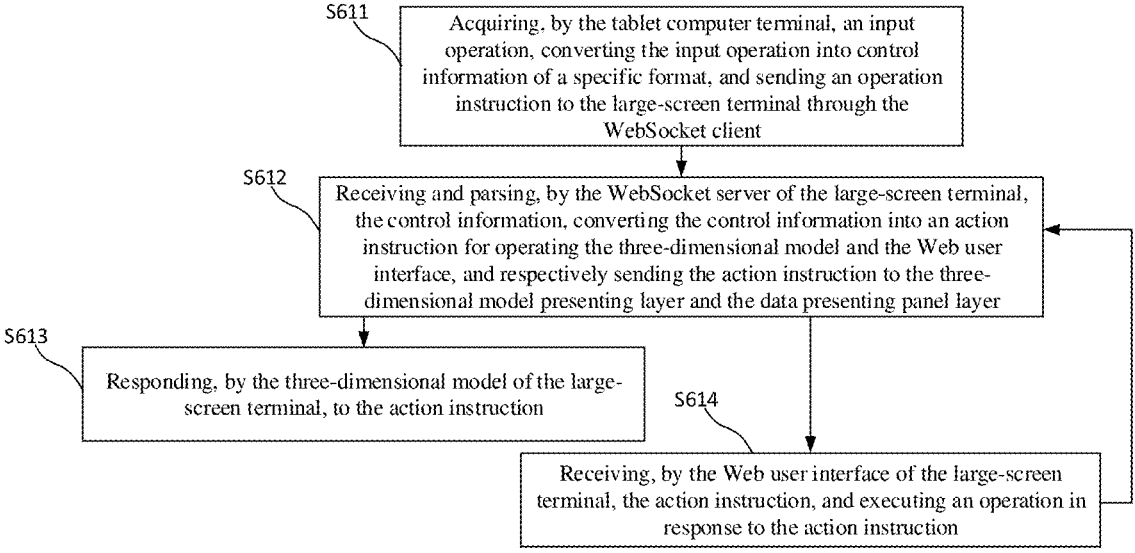
FIG. 6C shows a flow chart of a control method of the system shown in FIG. 6B provided by at least one embodiment of the present disclosure.

FIG. 6C shows a flow chart of a control method of the system shown in FIG. 6B that is provided by at least one embodiment of the present disclosure.

As shown in FIG. 6C, the control method may include step S611 to step S613.

Step S611: acquiring, by the tablet computer terminal 602, an input operation, converting the input operation into control information of a specific format, and sending an operation instruction to the large-screen terminal 601 through the WebSocket client in the tablet computer terminal 602.

Step S612: receiving and parsing, by the WebSocket server of the large-screen terminal 601, the control information, converting the control information into an action instruction for operating the three-dimensional model and the Web user interface (i.e., the data presenting panel layer), and respectively sending the action instruction to the three-dimensional model presenting layer and the data presenting panel layer.

Step S613: responding, by the three-dimensional model of the large-screen terminal 601, to the action instruction. For example, the three-dimensional model rotates and moves according to the action instruction.

Step S614: receiving, by the Web user interface of the large-screen terminal 601, the action instruction, and executing an operation in response to the action instruction. Meanwhile, the Web user interface of the large-screen terminal 601 may convert the operation executed in response to the action instruction into another operation instruction and send the another operation instruction to the WebSocket server of the large-screen terminal 601.

In some embodiments of the present disclosure, a protocol format of the WebSocket instruction (e.g., the above-described operation instruction, action instruction, etc.) may include: a touch screen instruction and a button click instruction.

For example, the touch screen instruction has a format of: {type:'mouse', name:'mouseButtonReleaseEvent', x:997.96875, y:741.94336, button: 1}.

In the format of the above-described touch screen instruction, for example, a value of type is 'mouse' indicating a gesture; values of name include: 'mouseButtonPressEvent' indicating a press gesture, 'mouseButtonReleaseEvent' indicating an up gesture, 'mouseMoveEvent' indicating a move gesture; x and y indicating a coordinate position of the click; and button indicating which finger it is.

For example, the button click instruction has a format of: {type='click_button', button='MGR'}; in the format of the button click instruction, a value of type indicates clicking the button, and the value of button (i.e., 'MGR') indicates a specific button.

Using the WebSocket technology is favorable for remote interaction between the Web user interface and other terminals, which improves applicability of the presenting method. In addition, the WebSocket can establish a long connection, which improves communication efficiency. The long connection refers to that a plurality of data packets may be sent consecutively on a communication connection. By using the WebSocket technology, the data presenting panel layer and the three-dimensional model presenting layer have good transferability. For example, the data presenting panel layer and the three-dimensional model presenting layer are deployed on the same terminal; the user can only perform operations on the terminal, but cannot perform remote operations; and by transferring the data presenting panel layer to the user's mobile device, the user may perform operations on the mobile device so as to control operations such as rotation and movement of the three-dimensional model on the terminal. Advantages of WebSocket protocol communication over JavaScript communication rest with that the former supports network communication and supports deployment of the data presenting panel layer and the three-dimensional model presenting layer onto different terminals.

Figure 6D:
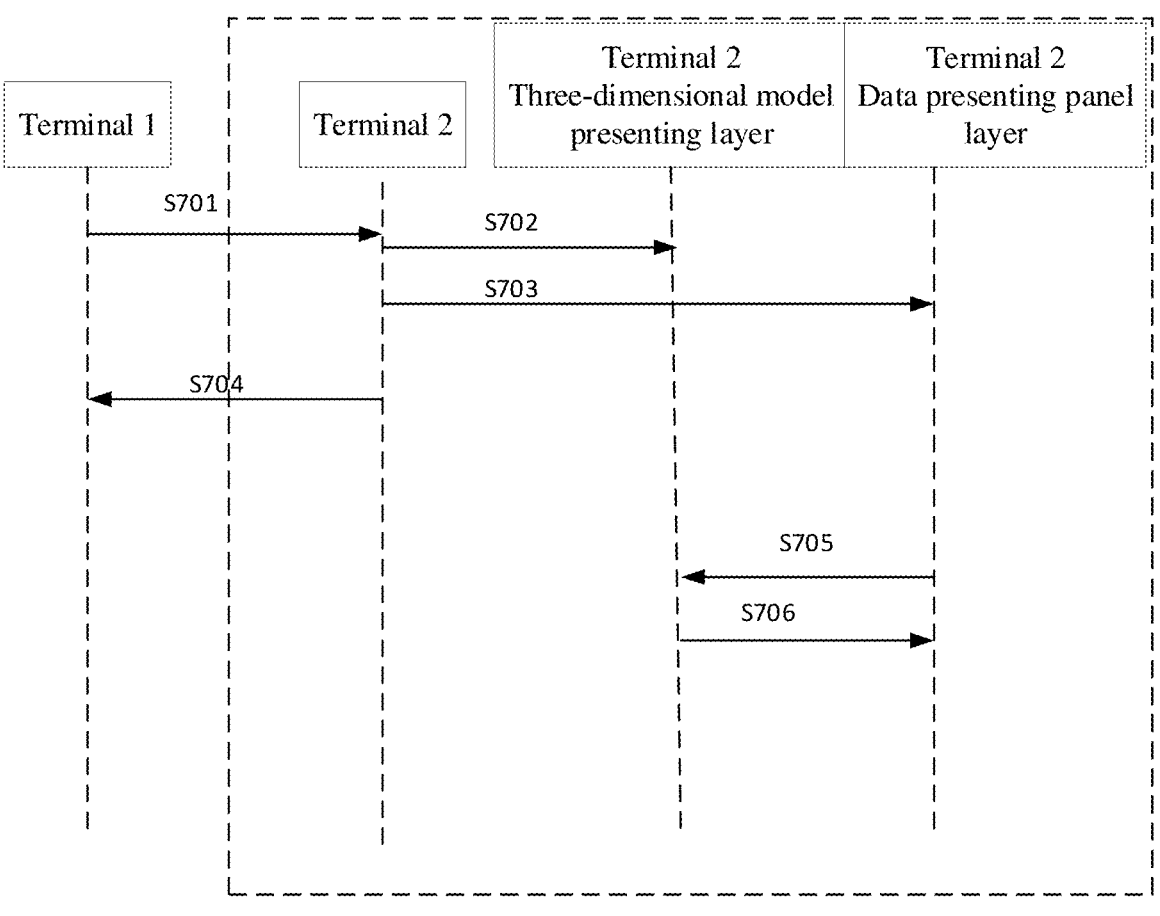
FIG. 6D shows a flow chart of another control method provided by at least one embodiment of the present disclosure.

FIG. 6D shows a flow chart of another control method provided by at least one embodiment of the present disclosure.

As shown in FIG. 6D, the control method may be applied to a presenting system including two terminals.

The control method includes step S701 to step S706.

Step S701: sending, by a terminal 1 to a terminal 2, an operation instruction (i.e., control information). The operation instruction is, for example, generated as the user executes an input operation on the terminal 1.

Step S702: sending, by the terminal 2, in response to receiving the operation instruction, the operation instruction to the three-dimensional model presenting layer in the terminal 2.

Step S703: sending, by the terminal 2, in response to receiving the operation instruction, the operation instruction to the data presenting panel layer in the terminal 2.

Step S702 and step S703 may be executed synchronously so as to perform presentation synchronously.

Step S704: sending, by the terminal 2 to the terminal 1, a call result message, to notify the terminal 1 that the operation instruction has been received.

Step S705: sending, by the data presenting panel layer in the terminal 2, another operation instruction to the three-dimensional model presenting layer in the terminal 2.

Step S706: sending, by the three-dimensional model presenting layer in the terminal 2, a call result message to the data presenting panel layer in the terminal 2, to notify the data presenting panel layer in the terminal 2 that another operation instruction has been received.

At least one embodiment of the present disclosure further provides an electronic device; the electronic device includes a processor and a memory; and the memory includes one or more computer program modules. The one or more computer program modules are stored in the memory and configured to be executed by the processor; and the one or more computer program modules include instructions for implementing the above-described information presenting method. The electronic device allows a user to conveniently view a scene presented by a three-dimensional model and data information corresponding to the scene, reduces operational complexity for the user to view the scene and data corresponding to the scene; in addition, in the method, the data information and the three-dimensional model information are respectively presented by a data presenting panel layer and a three-dimensional model layer that communicate with each other, which reduces a difficulty in simultaneously presenting the data information and the three-dimensional model information that are associated with each other, and improves development efficiency of the system for presenting the data information and the three-dimensional model information.

Figure 7:
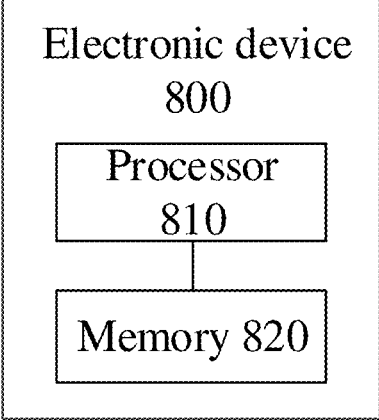
FIG. 7 shows a schematic block diagram of an electronic device provided by at least one embodiment of the present disclosure.

FIG. 7 is a schematic block diagram of an electronic device provided by some embodiments of the present disclosure. As shown in FIG. 7, the electronic device 800 includes a processor 810 and a memory 820. The memory 820 is used to store non-transitory computer readable instructions (such as one or more computer program modules). The processor 810 is used to run the non-transitory computer-readable instructions, and the non-transitory computer-readable instructions, when executed by the processor 810, may perform one or more steps of the information presentation method described above. The memory 820 and the processor 810 may be interconnected by a bus system and/or other forms of connection mechanisms (not shown).

For example, the processor 810 may be a central processing unit (CPU), a graphics processing unit (GPU) or other forms of processing unit with data processing capability and/or program execution capability. For example, the central processing unit (CPU) may be X86 or ARM architecture. The processor 810 may be a general-purpose processor or a special purpose processor, and may control other components in the electronic device 800 to perform desired functions.

For example, the memory 820 may include any combination of one or more computer program products, and the computer program products may include various forms of computer-readable storage media, such as volatile memory and/or nonvolatile memory. The volatile memory may include, for example, a random access memory (RAM) and/or a cache, etc. Non-volatile memory can include, for example, read-only memory (ROM), hard disk, erasable programmable read-only memory (EPROM), portable compact disk read-only memory (CD-ROM), USB memory, flash memory, etc. One or more computer program modules may be stored on the computer readable storage medium, and the processor 810 may run one or more computer program modules to realize various functions of the electronic device 800. The computer-readable storage medium may also store various applications and data, and various data used and/or generated by the applications.

It should be noted that, in the embodiment of the present disclosure, the specific functions and technical effects of the electronic device 800 can refer to the above description of the information presenting method, which is not repeated here.

Figure 8:
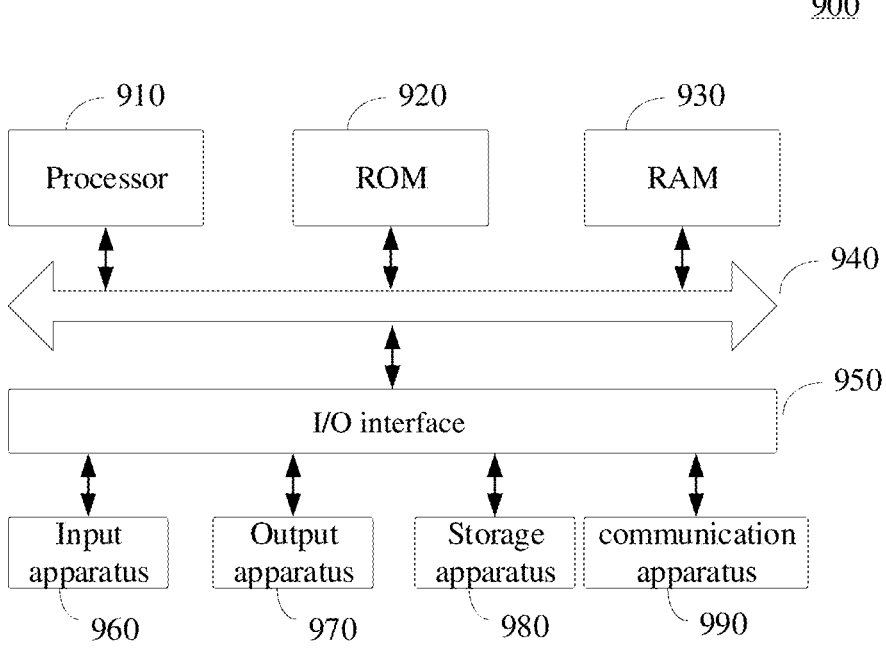
FIG. 8 shows a schematic block diagram of another electronic device provided by at least one embodiment of the present disclosure.

FIG. 8 is a schematic block diagram of another electronic device provided by some embodiments of the present disclosure. The electronic device 900 is suitable for implementing the information presenting method provided by the embodiment of the present disclosure. The electronic device 900 may be a terminal device or the like. It should be noted that the electronic device 900 shown in FIG. 8 is only an example, and it will not bring any restrictions on the functions and application scope of the embodiments of the present disclosure.

As shown in FIG. 8, the electronic device 900 may include a processing apparatus (e.g., CPU, GPU, etc.) 910, which may perform various appropriate actions and processes according to a program stored in the read-only memory (ROM) 920 or a program loaded from a storage apparatus 980 into a random access memory (RAM) 930. In the RAM 930, various programs and data required for the operation of the electronic device 900 are also stored. The processing device 910, the ROM 920 and the RAM 930 are connected to each other through a bus 940. An input/output (I/O) interface 950 is also connected to the bus 940.

Generally, the following apparatuses may be connected to the I/O interface 950: an input apparatus 960 including, for example, a touch screen, a touch panel, a keyboard, a mouse, a camera, a microphone, an accelerometer, a gyroscope, and the like; an output apparatus 970 including a liquid crystal display (LCD), a speaker, a vibrator, etc. A storage apparatus 980 including a magnetic tape, a hard disk, etc.; and a communication apparatus 990. The communication apparatus 990 may allow the electronic device 900 to perform wireless or wired communication with other electronic devices to exchange data. Although FIG. 8 shows an electronic device 900 with various apparatuses, it should be understood that it is not required to implement or have all the apparatuses shown, and the electronic device 900 may alternatively implement or have more or less apparatuses.

For example, according to an embodiment of the present disclosure, the above information presenting method may be implemented as a computer software program. For example, embodiments of the present disclosure include a computer program product, which includes a computer program carried on a non-transitory computer readable medium, and the computer program includes program code for executing the above-mentioned information presenting method. In such an embodiment, the computer program may be downloaded and installed from the network through the communication apparatus 990, or installed from the storage apparatus 980 or the ROM 920. When the computer program is executed by the processing apparatus 910, the functions defined in the information presenting method provided by the embodiment of the present disclosure can be realized.

At least one embodiment of the present disclosure also provides a computer-readable storage medium for storing non-transitory computer-readable instructions, which when executed by a computer can realize the above-mentioned information presenting method. By using the computer readable storage medium, the user can conveniently view the scene presented by the 3D model and the data information corresponding to the scene, which reduces the operation complexity of viewing the scene and the data corresponding to the scene. In addition, the method displays the data information and the 3D model information through the data presenting panel layer and the three-dimensional model presenting layer which communicate with each other, so as to reduce the difficulty of displaying the associated data information and the 3D model information at the same time and improve the development efficiency of the system for displaying the data information and the 3D model information.

Figure 9:
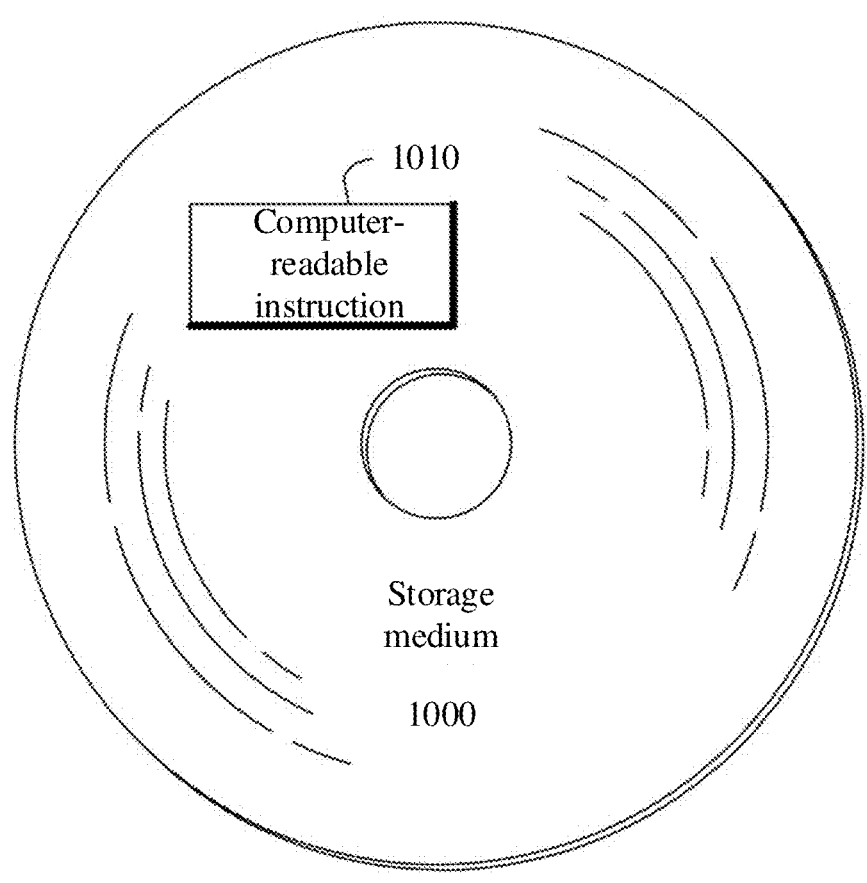
FIG. 9 shows a schematic diagram of a computer-readable storage medium provided by at least one embodiment of the present disclosure.

FIG. 9 is a schematic diagram of a storage medium provided by some embodiments of the present disclosure. As shown in FIG. 9, the storage medium 1000 is used to store computer readable instructions 1010 non-temporarily. For example, when the computer-readable instructions 1010 are executed by a computer, one or more steps of the information presenting method according to the above-described can be performed.

For example, the storage medium 1000 may be applied to the above-mentioned electronic device 800. For example, the storage medium 1000 may be the memory 820 in the electronic device 800 shown in FIG. 7. For example, the related description of the storage medium 1000 may refer to the corresponding description of the memory 820 in the electronic device 800 shown in FIG. 7, which will not be repeated here. For the present disclosure, the following points need to be explained:

(1) The drawings of the embodiments of the present disclosure only refer to the structures related to the embodiments of the present disclosure, and other structures may refer to the general design.

(2) Without conflict, the embodiments of the present disclosure and the features in the embodiments may be combined with each other to obtain a new embodiment.

The above is only the specific implementation of the present disclosure, but the scope of protection of the present disclosure is not limited to this. The scope of protection of the present disclosure should be based on the scope of protection of the claims.

The invention claimed is:

1. An information presenting method, comprising:
presenting data information in a data presenting panel layer; and
presenting three-dimensional model information in a three-dimensional model presenting layer, wherein the three-dimensional model presenting layer is different from the data presenting panel layer; and
wherein the data presenting panel layer and the three-dimensional model presenting layer communicate with each other through a support layer, and the data information is associated with the three-dimensional model information;
wherein the data information is associated with the three-dimensional model information, comprises:
in response to a change in the three-dimensional model information presented by the three-dimensional model presenting layer, presenting updated data information associated with the changed three-dimensional model information in the data presenting panel layer;
in response to a change in the data information presented by the data presenting panel layer, presenting updated three-dimensional model information associated with the changed data information in the three-dimensional model presenting layer, the data information in the data presenting panel layer is visual information;
wherein the data presenting panel layer and the three-dimensional model presenting layer are provided on a same page to present the data information and the three-dimensional model information;
wherein the data presenting panel layer and the three-dimensional model presenting layer are stacked on the page to present the data information and the three-dimensional model information;
wherein the data presenting panel layer is closer to a viewer than the three-dimensional model presenting layer, and the data presenting panel layer is at least partially configured to be transparent or translucent to reveal at least a portion of the three-dimensional model presenting layer.

2. The method according to claim 1, wherein the support layer is presented in the page in a form of a base layer, and the data presenting panel layer and the three-dimensional model presenting layer are stacked on the base layer.

3. The method according to claim 1, wherein the data presenting panel layer is deployed in a first container of the support layer, and the three-dimensional model presenting layer is deployed in a second container of the support layer.

4. The method according to claim 1, wherein the data presenting panel layer is obtained based on a cross-platform interface development framework.

5. The method according to claim 4, wherein the data presenting panel layer is a panel layer supported by a browser or a panel layer supported by an operating system.

6. The method according to claim 1, further comprising:
receiving control information; and
synchronously adjusting the data information presented in the data presenting panel layer and the three-dimensional model information presented in the three-dimensional model presenting layer according to the control information.

7. The method according to claim 6, wherein the data presenting panel layer and/or the three-dimensional model presenting layer directly receives the control information; or
the data presenting panel layer and the three-dimensional model presenting layer receive the control information through the support layer.

8. The method according to claim 1, wherein the data presenting panel layer and the three-dimensional model presenting layer communicate with each other through one of following means of the support layer: Windows form message, function call, JavaScript call, WebSocket protocol, Http protocol, TCP protocol, UDP protocol.

9. The method according to claim 1, further comprising:
providing the data presenting panel layer in a first terminal; and
providing the three-dimensional model presenting layer in a second terminal;
wherein the support layer is deployed in the first terminal and/or the second terminal and the data information and the three-dimensional model information are simultaneously presented in the first terminal and the second terminal.

10. An electronic device, comprising:
a processor; and
a memory, comprising one or more computer program instructions;
wherein the one or more computer program instructions are stored in the memory, and when executed by the processor, the information presenting method according to claim 1 is achieved.

11. A non-transitory computer-readable storage medium which stores computer-readable instructions, wherein when the computer-readable instructions are executed by a computer, the computer executes the information presenting method according to claim 1.

12. A presenting system, comprising a first terminal, wherein the first terminal is configured to provide a first data presenting panel layer to present data information, and is configured to provide a first three-dimensional model presenting layer to present three-dimensional model information, the first three-dimensional model presenting layer is different from the first data presenting panel layer;

the first data presenting panel layer and the first three-dimensional model presenting layer communicate with each other through the support layer, and the data information is associated with the three-dimensional model information;

wherein the data information is associated with the three-dimensional model information, comprises:

in response to a change in the three-dimensional model information presented by the first three-dimensional model presenting layer, presenting updated data information associated with the changed three-dimensional model information in the first data presenting panel layer;

in response to a change in the data information presented by the first data presenting panel layer, presenting updated three-dimensional model information associated with the changed data information in the first three-dimensional model presenting layer, the data information in the data presenting panel layer is visual information;

wherein the data presenting panel layer and the three-dimensional model presenting layer are provided on a same page to present the data information and the three-dimensional model information;

wherein the data presenting panel layer and the three-dimensional model presenting layer are stacked on the page to present the data information and the three-dimensional model information;

wherein the data presenting panel layer is closer to a viewer than the three-dimensional model presenting layer, and the data presenting panel layer is at least partially configured to be transparent or translucent to reveal at least a portion of the three-dimensional model presenting layer.

13. The presenting system according to claim 12, further comprising a second terminal, wherein the second terminal is configured to provide a second data presenting panel layer, and the second data presenting panel layer and the first data presenting panel layer communicate with each other; or the second terminal is configured to provide a second three-dimensional model presenting layer to present three-dimensional model information, and the second three-dimensional model presenting layer communicates with the first data presenting panel layer.

14. The presenting system according to claim 12, wherein the first data presenting panel layer and the three-dimensional model presenting layer communicate with each other through a WebSocket protocol.

15. A presenting system, comprising a first terminal and a second terminal, wherein the first terminal is configured to provide a first data presenting panel layer to present data information;

the second terminal is configured to provide a three-dimensional model presenting layer to present three-dimensional model information;

the first data presenting panel layer and the three-dimensional model presenting layer communicate with each other through a support layer; and the data information is associated with the three-dimensional model information;

wherein the data information is associated with the three-dimensional model information, comprises:

in response to a change in the three-dimensional model information presented by the three-dimensional model presenting layer, presenting updated data information associated with the changed three-dimensional model information in the first data presenting panel layer;

in response to a change in the data information presented by the first data presenting panel layer, presenting updated three-dimensional model information associated with the changed data information in the three-dimensional model presenting layer, the data information in the data presenting panel layer is visual information;

wherein the data presenting panel layer and the three-dimensional model presenting layer are provided on a same page to present the data information and the three-dimensional model information;

wherein the data presenting panel layer and the three-dimensional model presenting layer are stacked on the page to present the data information and the three-dimensional model information;

wherein the data presenting panel layer is closer to a viewer than the three-dimensional model presenting layer, and the data presenting panel layer is at least partially configured to be transparent or translucent to reveal at least a portion of the three-dimensional model presenting layer.

16. The presenting system according to claim 15, wherein the second terminal is further configured to provide a second data presenting panel layer, the second data presenting panel layer communicates with the first data presenting panel layer.

* * * * *